United States Patent
Shih

(10) Patent No.: US 8,874,246 B2
(45) Date of Patent: Oct. 28, 2014

(54) INTERACTIVE MEDIA PLAYING SYSTEM AND METHOD

(75) Inventor: Shu-Fen Shih, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 488 days.

(21) Appl. No.: 13/242,549

(22) Filed: Sep. 23, 2011

(65) Prior Publication Data

US 2012/0143362 A1    Jun. 7, 2012

(30) Foreign Application Priority Data

Dec. 3, 2010    (TW) .............................. 099142208 A

(51) Int. Cl.
*G06F 17/00* (2006.01)

(52) U.S. Cl.
USPC ........................................................... 700/94

(58) Field of Classification Search
CPC .................... G06F 17/30029; G06F 17/30035; G06F 17/30038; G06F 17/30053; G06F 17/30743; G06F 17/30749; G06F 17/30772; G06F 17/30867
See application file for complete search history.

(56) References Cited

U.S. PATENT DOCUMENTS

| | | | | |
|---|---|---|---|---|
| 7,548,934 B1* | 6/2009 | Platt et al. | ............................ | 1/1 |
| 2007/0208771 A1* | 9/2007 | Platt | ............................ | 707/102 |
| 2009/0164641 A1* | 6/2009 | Rogers et al. | ................. | 709/227 |
| 2010/0280641 A1* | 11/2010 | Harkness et al. | ............... | 700/94 |
| 2011/0107431 A1* | 5/2011 | Sukanen | .......................... | 726/27 |
| 2011/0125765 A1* | 5/2011 | Tuli | ............................... | 707/751 |

* cited by examiner

*Primary Examiner* — Andrew C Flanders
(74) *Attorney, Agent, or Firm* — Muncy, Geissler, Olds & Lowe, P.C.

(57) ABSTRACT

An interactive media playing system and method are presented. The system includes a server and a media playing device. After the media playing device logs in to the server, the server compares personal data of a authenticated member data with matching information of media information, finds at least one target media information, introduces matching information of the target media information and the personal data of the authenticated member data into a weighted distribution rule, in order to find a media playing sequence conforming to both the matching information of the target media information and the personal data of the authenticated member data, and outputs the media information to a media playing device. In this way, a user can perform an operation behavior on the media information through the media playing device.

11 Claims, 20 Drawing Sheets

FIG. 2C

INTERACTIVE MEDIA PLAYING SYSTEM AND METHOD

CROSS-REFERENCE TO RELATED APPLICATION

This application claims the benefit of Taiwan Patent Application No. 099142208, filed on Dec. 3, 2010, which is hereby incorporated by reference for all purposes as if fully set forth herein.

BACKGROUND OF THE INVENTION

1. Field of Invention

The present invention relates to a media playing system and its method, and more particularly to an interactive media playing system and method for automatically generating the regulation of media playing sequences that satisfy various demands of users by combining personal data of the users with product matching information provided by vendors.

2. Related Art

The playing mode of online advertisements in the prior art is mostly shown as follows. A parent file of an advertising media is provided by a provider (ex: product manufacturer or product vendor) and is then played on a web page by an advertisement contractor, a telecommunication operator, or a network company via a network system so that a user can click the advertising media, or the advertising media can be automatically played when a network device is used by the user to connect to the web page; Alternatively, the advertising media is directly sent to the network device of the user, for example, a mobile phone, a personal digital assistant, or any other electronic apparatus having capabilities of network connection and media information playing.

Nowadays, online advertising modes are gradually diversified; The number of playing times of each advertising media is recorded, and advertising media ranking is also provided for the user's reference and clicking In addition, advertising media are classified into different categories for reference of users having different demands.

However, in the above mentioned advertising media ranking, advertising media are classified upon the entirety of the advertising media or according to product types, and the click rate is calculated by the number of clicking on certain advertising media by users. In practice, the users have different demands and preferences for products, and the users' demands for product types also vary due to different conditions such as environment of activity, personal income ability, age, and work field. Therefore, the above advertisement ranking or advertising media classification cannot fully satisfy the demands of the users.

Moreover, according to basic data or preference data input by a user, a vendor may arrange a media playing sequence to be presented to customers in a fixed media arrangement manner to play media in accordance with the sequence. However, if a product advertisement favored by the user or relevant media information is located in the later part of the media playing sequence, the user must wait for the preceding media information to play before viewing the desired product advertisement. This waiting decreases the user friendly aspect of the arrangement. Therefore, vendors should consider the issue of how to better satisfy user demands by changing the existing technology for playing advertising media so that it can reorder the sequence of playing the advertising media.

SUMMARY OF THE INVENTION

The present invention is directed to a media playing system and method for automatically generating and adjusting media playing sequences to satisfy various user demands by combining personal data of the users with product matching information provided by vendors.

In order to solve the system problem mentioned above, the present invention provides an interactive media playing system, which comprises a server and a media playing device connected to each other through a network.

The server comprises a media database for storing a plurality of media information, a member database for recording a plurality of member data, a member management module, and a media management module.

In the server, the member management module obtains authentication analysis corresponding to any one of the plurality of member data; the media management module finds at least one target media information from all the media information based on personal data of the member data that corresponds to the authentication analysis after the member authentication analysis is completed; the media management module then introduces the personal data and a matching information of each target media information into a weighted distribution rule, to obtain at least one initial media playing sequence, and then the module outputs the target media information according to the initial media playing sequences.

The media playing device is used for performing the authentication analysis with the member management module in order to obtain the target media information of the initial media playing sequence, and is used for operating and playing the media information.

In order to solve the above method problem, the present invention provides an interactive media playing method, which is applied to a server providing a media information to a media play device according to the login of the media playing device. The method involves: obtaining personal data of an authenticated member data by a member management module; matching the personal data of the authenticated member data with matching information of a plurality of media information by a media management module, so as to obtain at least one target media information from the media information; introducing matching information of the target media information and the personal data of the authenticated member data into a weighted distribution rule by the media management module, so as to obtain at least one initial media playing sequence; and outputting the target media information to the media playing device according to the initial media playing sequence given by the media management module.

The interactive media playing method provided in the present invention further comprises: collecting an operation behavior of the media information of the initial media playing sequence by the media management module, so as to generate a click-to-read history information of the authenticated member data; and obtaining at least one product type of media information with a highest click rate, and deciding whether to add the product type of the media information with the highest click rate to the personal data of the authenticated member data according to whether the product type of the media information with the highest click rate exists in the personal data of the authenticated member data by the media management module.

The interactive media playing method provided in the present invention further comprises: determining whether any media information satisfies a corresponding threshold condition by the media management module, so as to decide whether to provide selection of a plurality of reward information; and periodically generating at least one secondary media playing sequence according to the click-to-read history information in combination with the weighted distribution rule by the media management module, so as to replace the at least one initial media playing sequence.

The present invention is characterized as follows. Product matching information of media information provided by a vendor (object conditions having the product purchasing power) is combined with personal data of member data (i.e. personal factors such as preference, scope of activity, and income) to serve as forming factors of a media information playing sequence. They are then introduced into a weighted distribution rule, in order to automatically deduce the playing sequence approximating a user's actual preference for products and provide product advertisement data. Afterwards, in combination with a processing behavior of the user on the media information, the playing sequence is further modified to approximate the user's actual preference for products, so that the user can preferentially obtain preferred product advertisement data and make use of a customized advertisement playing service mechanism. In addition, the adjustment of the media playing sequence helps the user click a preceding advertisement media, so as to increase the click rate of the preceding advertisement media as well as the exposure rate of the relevant product and the provider(manufacturer or vendor) thereof, thereby reinforcing the user's impression of the product and its provider and facilitating creation of a positive image for the provider. Additionally, the reward mechanism is integrated in the mechanism of generating and executing the media playing sequence; so as long as the provider provides a reward item and an execution condition, the system greatly improves the convenience and practicability of the reward mechanism because it is capable of deciding whether to automatically implement the reward mechanism if the click-to-read history information satisfies a threshold condition.

BRIEF DESCRIPTION OF THE DRAWINGS

The present invention will become more fully understood from the detailed description given herein below for illustration only, and thus are not limitative of the present invention, and wherein:

FIG. 2A to FIG. 2J are schematic views of examples of interaction pictures and media interfaces of the interactive media playing system according to the embodiment of the present invention;

DETAILED DESCRIPTION OF THE INVENTION

The preferred embodiments of the present invention are illustrated in detail below with reference to the accompanying drawings. However, the invention should not be limited to only these embodiments.

Figure 1A:
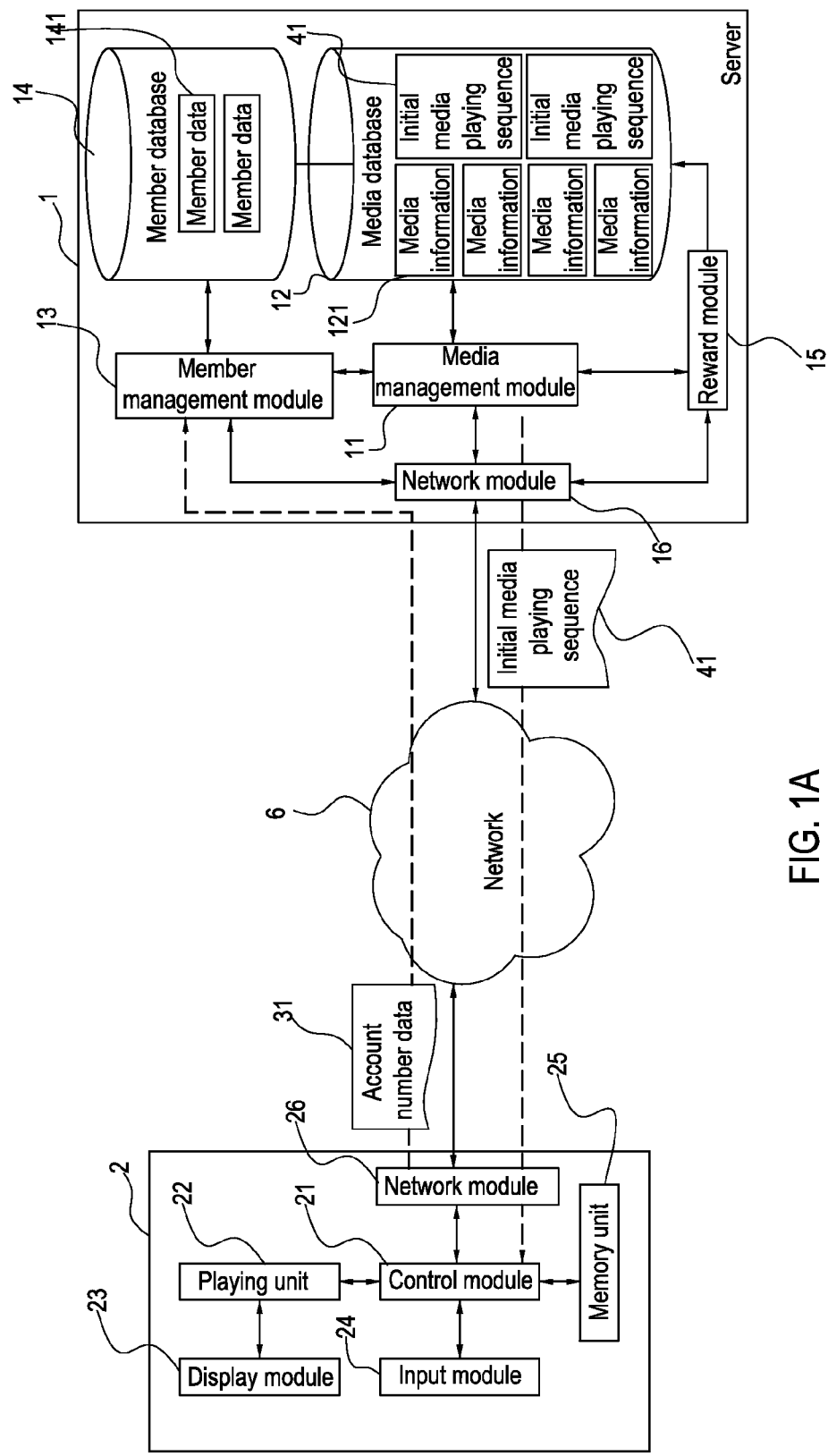
FIG. 1A to FIG. 1D are schematic architectural views of an interactive media playing system according to an embodiment of the present invention.
Figure 1B:
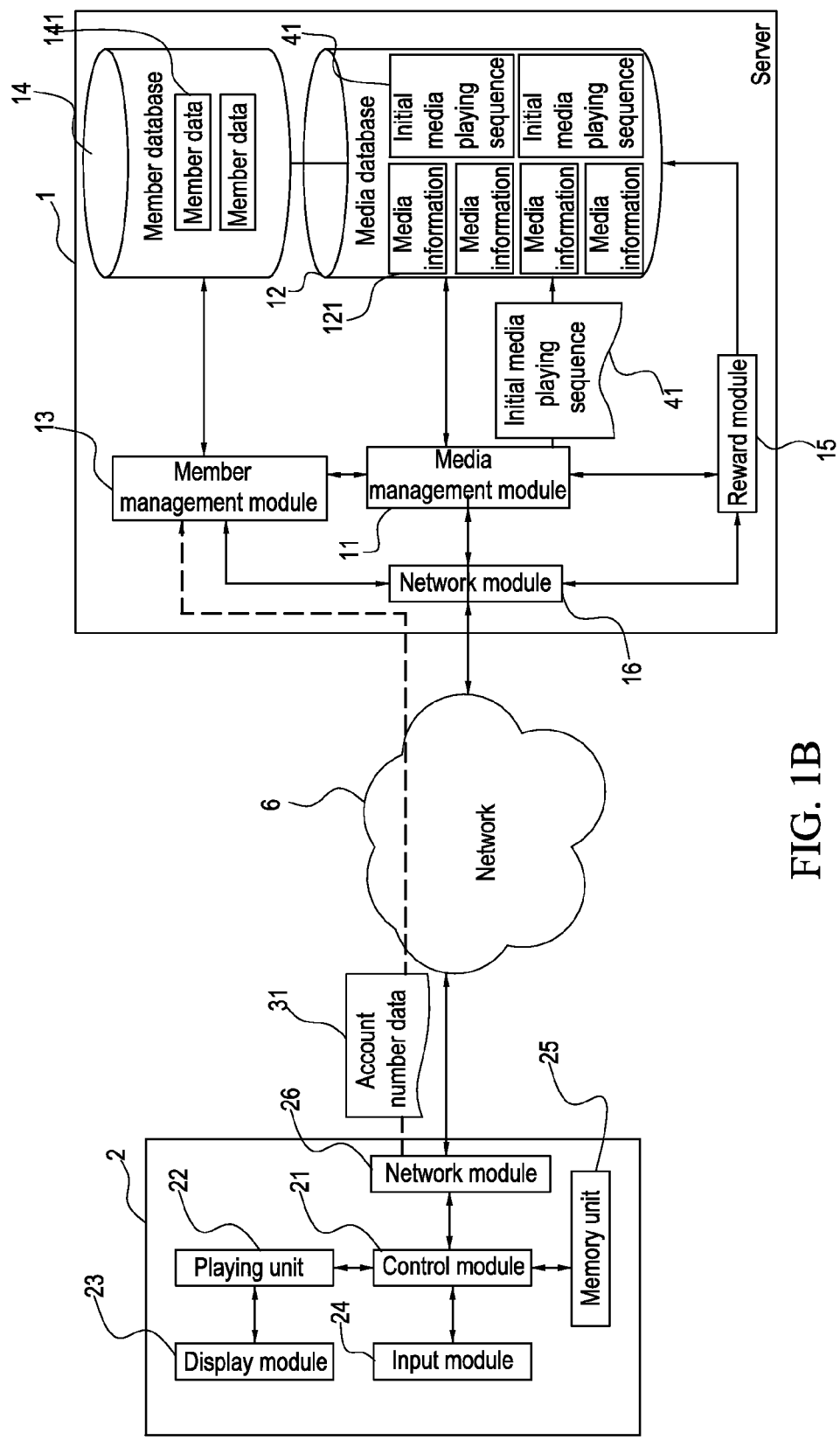

Firstly, referring to FIG. 1A and FIG. 1B, they are schematic architectural views of an interactive media playing system according to an embodiment of the present invention. The interactive media playing system includes a server 1 and a media playing device 2.

The server 1 includes a media database 12, a member database 14, a member management module 13, a media management module 11, and a reward module 15. The media playing device 2 includes an input module 24, a display module 23, a playing unit 22, and a control module 21. The server 1 and the media playing device 2 form network interconnection through respective network modules (16, 26). The network interconnection mode includes, but is not limited to, an Internet, a local area network, or any other similar network 6. The input module 24 is, for example, but not limited to, a manual control or acoustic control data input component such as keys, a touch panel, and a microphone, or a touch screen integrating the display picture capability of the display module 23.

A user initially uses the input module 24 to input an account number data 31. The account number data 31 is received by the control module 21, and is transmitted to the server 1 through the network. The member management module 13 performs a member authentication analysis on the account number data 31, so as to determine whether the account number data 31 conforms to any member data 141. When the result is that the account number data 31 conforms to one of the member data 141, the member management module 13 determines that the member authentication analysis is completed, and notifies the media management module 11 of current authenticated member data on which the certification is completed. The media management module 11 provides an initial media playing sequence 41 according to the authenticated member data. The initial media playing sequence 41 is provided in the following manner.

(1) As shown in FIG. 1A, the initial media playing sequence 41 corresponding to each member data 141 is prestored in the media database 12, and the media management module 11 reads the media database 12 to extract the initial media playing sequence 41 corresponding to the authenticated member data.

(2) If no initial media playing sequence 41 is prestored in media database 12, the media management module 11 generates the initial media playing sequence 41 according to a data content of the authenticated member data. Each member data 141 includes at least one personal data, for example, at least one of member's family income, member's family member, member's gender, member's age, member's preferred product type, member's region of activity, member's occupational field, member's work unit, and member's personal income. Each media information corresponds to at least one matching information such as a member matching condition having the purchasing power of a product provided by the media information or specifications of the product itself. The matching information includes at least one of the following: product keywords, member's family income, member's family member, member's gender, member's age, product type, member's region of activity, member's occupational field, member's work unit, member's personal income, product discount, and media playing time limit and a matching condition thereof. One example of a so-called matching condition is that the member's family income needs to be "5 million/year", the member's field of activity is south region of Taiwan such as "Kaohsiung, Tainan, Pingtung", and the member's preferred product type needs to include "house type" etc. The media management module 11 determines by itself the order of importance of data contents of the member data 141 after the member authentication analysis is completed.

Then, the media management module 11 uses the personal data of the member data 141 to find at least one target media information conforming thereto, uses matching information of the target media information and the personal data of the member data 141 as input data, and introduces the input data into a weighted distribution rule, in order to obtain at least one initial media playing sequence 41. The initial media playing sequence 41 matches both the matching information of the target media information and the personal data of the member data 141.

(3) As shown in FIG. 1B, when the member management module 13 creates an added member data 32, that is, when the user uses the media playing device 2 to connect to the server 1 to register new member data 141, the member management module 13 requests the user to input a preferred product type, records it in the member database 14, requests the media management module 11 to use the matching information of the target media information and the personal data of the member data 141 as input data according to the added member data 141, and introduces the input data into the weighted distribution rule, in order to obtain at least one initial media playing sequence 41, of which at least one initial media playing sequence 41 conforms to both the matching information of the target media information and the personal data of the member data 141, and then stores the initial media playing sequence in the media database 12.

(4) If the member corresponding to the authenticated member data logs in after the first time and the media database 12 has the record of a previous media playing sequence stored therein, the media management module 11 directly extracts the record of the previous media playing sequence as a current initial media playing sequence 41.

Then, regardless of the system architecture in FIG. 1A and FIG. 1B, the media management module 11 reads the media database 12, and outputs relevant media information 121 to the media playing device 2 sequentially according to the initial media playing sequences 41. The control module 21 uses the playing unit 22 to play the media information 121 according to a receiving sequence of the media information 121 (the initial media playing sequences 41), and the media information 121 is displayed in the visual field of the user through the display module 23.

At this time, the user can use the input module 24 to perform various processing actions on the played media information 121 such as click to play the whole content of the media information 121; store the media information 121 designated by the user through the input module 24, and store the media information 121 in a memory unit 25 of the media playing device 2; delete the sorting of any media information 121 in the initial media playing sequence 41 (that is, remove the playing sort data of any media information 121 from the initial media playing sequence 41, instead of deleting the source data of the media information 121 from the server 1); upon clicking any media information 121, respond to a question or questionnaire provided by the clicked media information 121; and purchase an electronic service authentication for any media information 121, that is, obtain the relevant electronic service authentication from a provider(ex: product manufacturer or product vendor) apparatus when viewing the media information 121, where the electronic service authentication is also recorded in the media database 11, and a service apparatus of a seller needs to be connected to the server 1, and when the user purchases a product from the seller, corresponding data of a relevant electronic service authentication (such as member data) must be simultaneously provided, and the seller then provides a service of the product (i.e. a discount, a gift, or other benefits) corresponding to the electronic service authentication, after knowing that the user really has purchased the relevant electronic service authentication through the server; viewing a sale point of the media information 121, that is, switch to a web page or a product sales web page having media information 121 actually sent by a provider completing an online transaction behavior of a product corresponding to any media information 121; and logging in the product sales web page or the web page of the provider to become a member of the provider with respect to any media information 121.

Figure 1C:
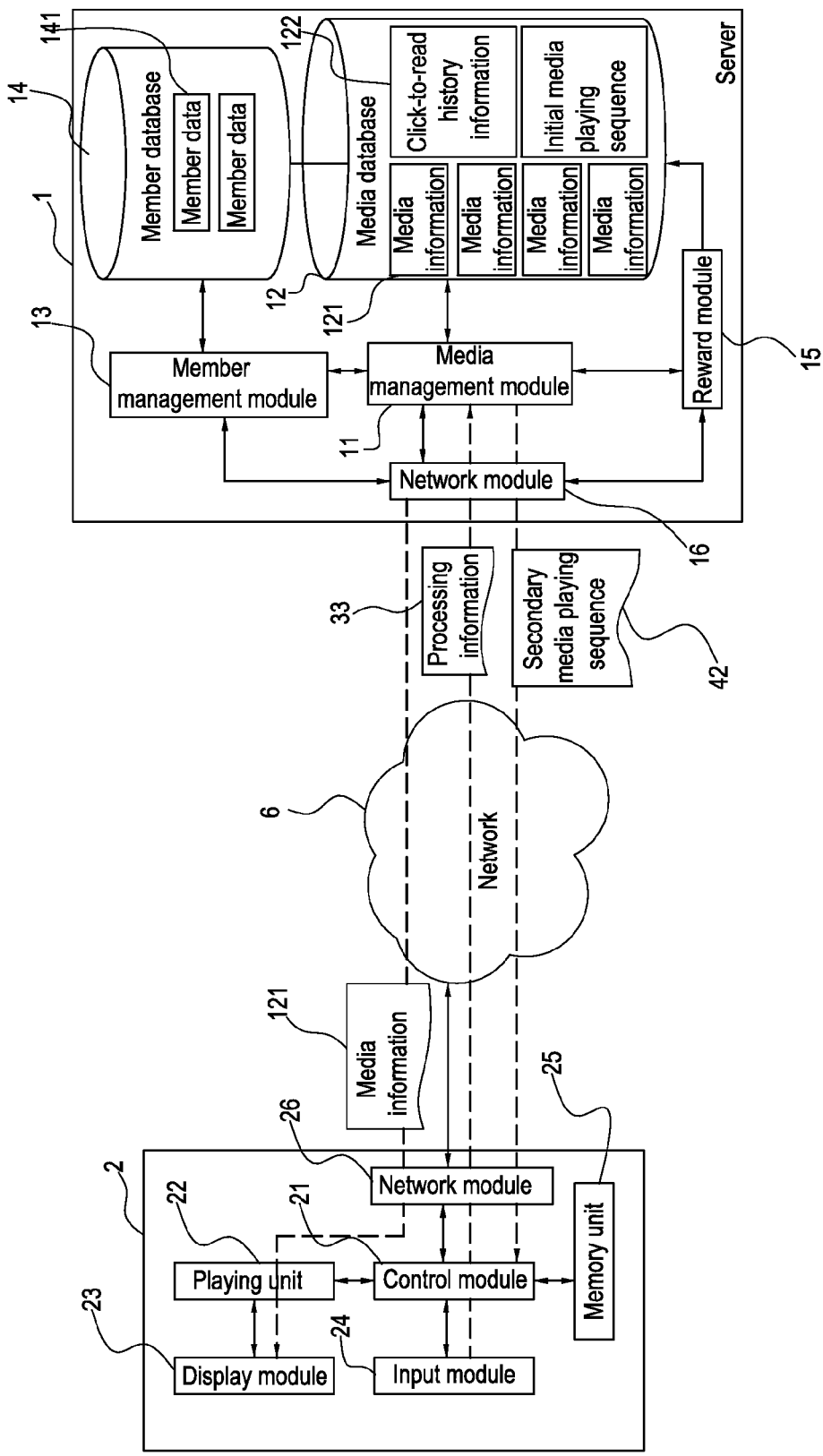

As shown in FIG. 1C, the above processing behaviors of the media information 121 are selected by the user through the input module 24, and processing information 33 formed by the control module 21 is transmitted back to the media management module 11. The media management module 11 collects the processing information returned by the control module 21 within a preset time, in order to form click-to-read history information 122 corresponding to the authenticated member data. Here, the click-to-read history information 122 refers to the accumulated number of the processing actions or data change of the media information. Each member data 141 corresponds to click-to-read history information 122, in which the click-to-read history information 122 may be stored in either one or both media database 12 and the member database 11.

The click-to-read history information 122 not only records the processing information returned by the control module 21, but also records the product type of the media information that is operated. The media management module 11 calculates click rates of the media information 121 recorded by the click-to-read history information 122 to obtain at least one product type of media information with a highest click rate according to the click-to-read history information 122 corresponding to the authenticated member data and decides whether or not the product type is newly added to personal data of the authenticated member data according to whether the product type exists in the personal data of the authenticated member data.

However, the reward module 15 determines whether each media information 121 satisfies a corresponding threshold condition within a preset time. The preset time is just a length of time and is not limited to a long time, short time, continuous time, or discontinuous time. The threshold condition refers to whether a number of processing times of each media information reaches a threshold, or whether numbers of processing times of all the media information reach the threshold. The value of the threshold is specified by the provider and implemented in the system or implemented by the media management module 11 itself, but the present invention is not limited thereto.

If the media management module 11 determines that any media information 121 does not satisfy the threshold condition, the media management module 11 re-collects a number of processing times of the media information 121. On the contrary, if the media management module 11 determines that any media information 121 satisfies the threshold condition, the media management module 11 uses a weighted distribution rule to re-generate a secondary media playing sequence 42 to output the media information according to the secondary media playing sequence 42. Alternatively, the media management module 11 regularly reads personal data of the member data 141 and matching information of the media information 121 in the memory unit 25 and then uses a weighted distribution rule to generate a secondary media playing sequence 42 matching demands of the members.

It should be noted herein that, the so-called weighted distribution rule can be several known algorithms, for example, a fusion algorithm, a multivariate statistical analysis algorithm, a data sort algorithm, a genetic algorithm, or a particle swarm optimization algorithm. The secondary media playing sequence 42 may also be recorded in the media database 12 or may further update and replace the initial media playing sequence 41.

Afterward the media management module 11 outputs relevant media information 121 to the media playing device 2 sequentially according to the secondary media playing sequence 42. The control module 21 uses the playing unit 22 to play the media information 121 according to a receiving sequence of the media information 121 (that is, the secondary media playing sequence 42), and the media information 121 is displayed within the visual field of the user through the display module 23.

Figure 1D:
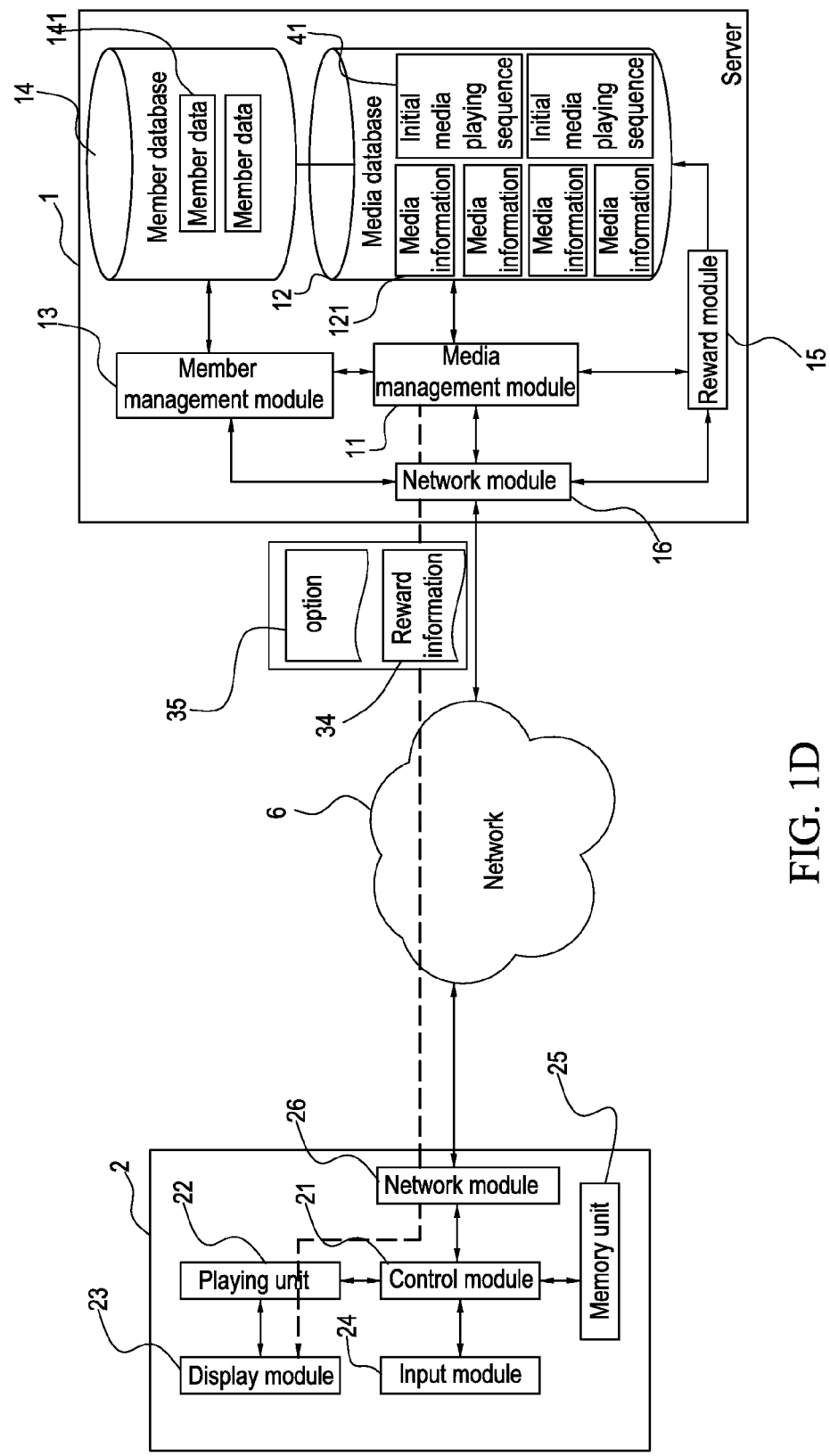

However, regardless of whether the initial media playing sequence 41 or the secondary media playing sequence 42 is employed, upon determining that any media information satisfies a threshold condition, the reward module 15 provides various reward information about the media information 121 (as shown in FIG. 1D) and provides an option for the user to select one from the reward information. The reward information 34 and the option 35 are both displayed on the display module 23 to allow the user to input a desired reward by using the input module 24. The reward information 34 includes a service discount and purchase of at least one product.

In addition, the media database 12 records a total number of playing times of an electronic service authentication of each media information 121, and the media management module 11 records a current number of playing times and a remaining number of playing times of the electronic service authentication of each media information 121, in which the remaining number of playing times is a difference between the total number of playing times and the current number of playing times.

For example, when a total number of playing times of an electronic service authentication related to media information 121 of a product output by server 1 is 1000, and the media management module 11 determines that a check point of a current number of playing times is 500, that is, the recovery rate is 50%, namely, 250 times, at this time, the remaining number of playing times is 500. If the media management module 11 determines that the recovery rate is lower than 50%, the media management module 11 will not output the electronic service authentication according to the original media playing sequence and number of playing times, but sends the electronic service authentication based on the number of times for the provider that really intends to provide the electronic service authentication in the remaining number of playing times according to demands of the provider. For example, if the provider only intends to provide 50 times of the electronic service authentication within 500 remaining number of playing times, during presetting of the system, the media management module 11 only sends media information 121 having the electronic service authentication 50 times. On the contrary, if the media management module 11 determines that the recovery rate is higher than 50%, the media management module 11 outputs the electronic service authentication according to the original media playing sequence and number of playing times, for example, plays media information 121 having the electronic service authentication 500 times continuously.

Referring to FIG. 2A to FIG. 2J, they are schematic views illustrating interaction pictures of the interactive media playing system according to the embodiment of the present invention. FIG. 2A to FIG. 2J are illustrated in combination with a playing picture of the media playing device. Clicking on the items in FIG. 2A will open interfaces shown in FIG. 2B to FIG. 2J. Meanwhile, reference is made to FIG. 1 for ease of understanding.

When the media playing device 2 is connected to the server 1, the server 1 initially provides home page media information for the media playing device 2 to play. Afterward the media playing device 2 switches to a user interface 27. Alternatively, the server may not transmit the home page media information, and the media playing device 2 may immediately switch to the user interface 27.

A data architecture of each media information may be established in the form of a cellular folder, and different media interfaces are provided to the user interface according to different member demands. The pictures or software programs of the media interface are provided by the media management module 11 or pre-stored in the media database 12. Each media interface corresponds to a media playing sequence (It does not matter whether the sequence is an initial media playing sequence or a secondary media playing sequence).

Figure 2A:
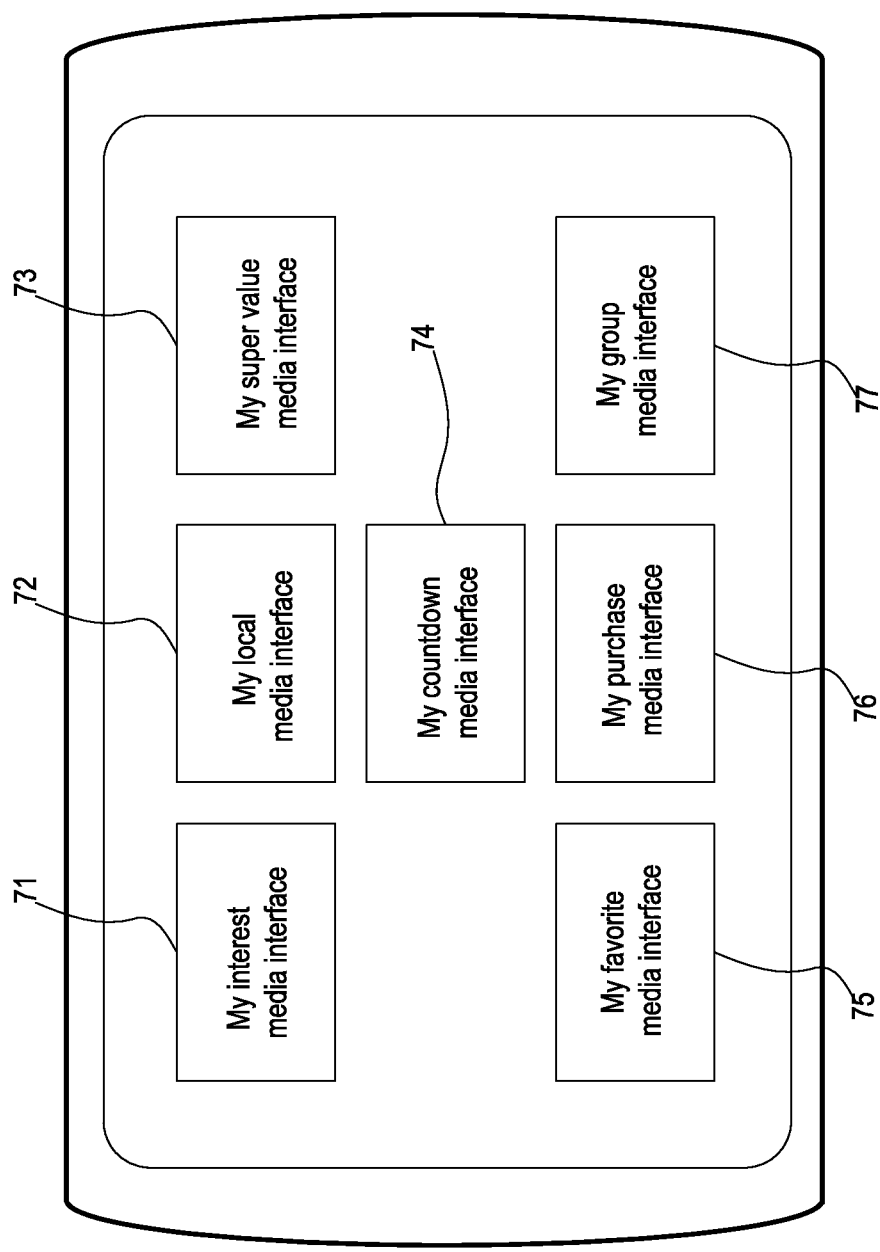

While this embodiment illustrates different forms of the media interfaces with examples, the present invention is not limited to these examples. As shown in FIG. 2A, the media interface presented on the user interface 27 includes a my interest media interface 71, a my local media interface 72, a my super value media interface 73, a my countdown media interface 74, a my favorite media interface 75, a my purchase media interface 76, and a my group media interface 77.

Figure 2B:
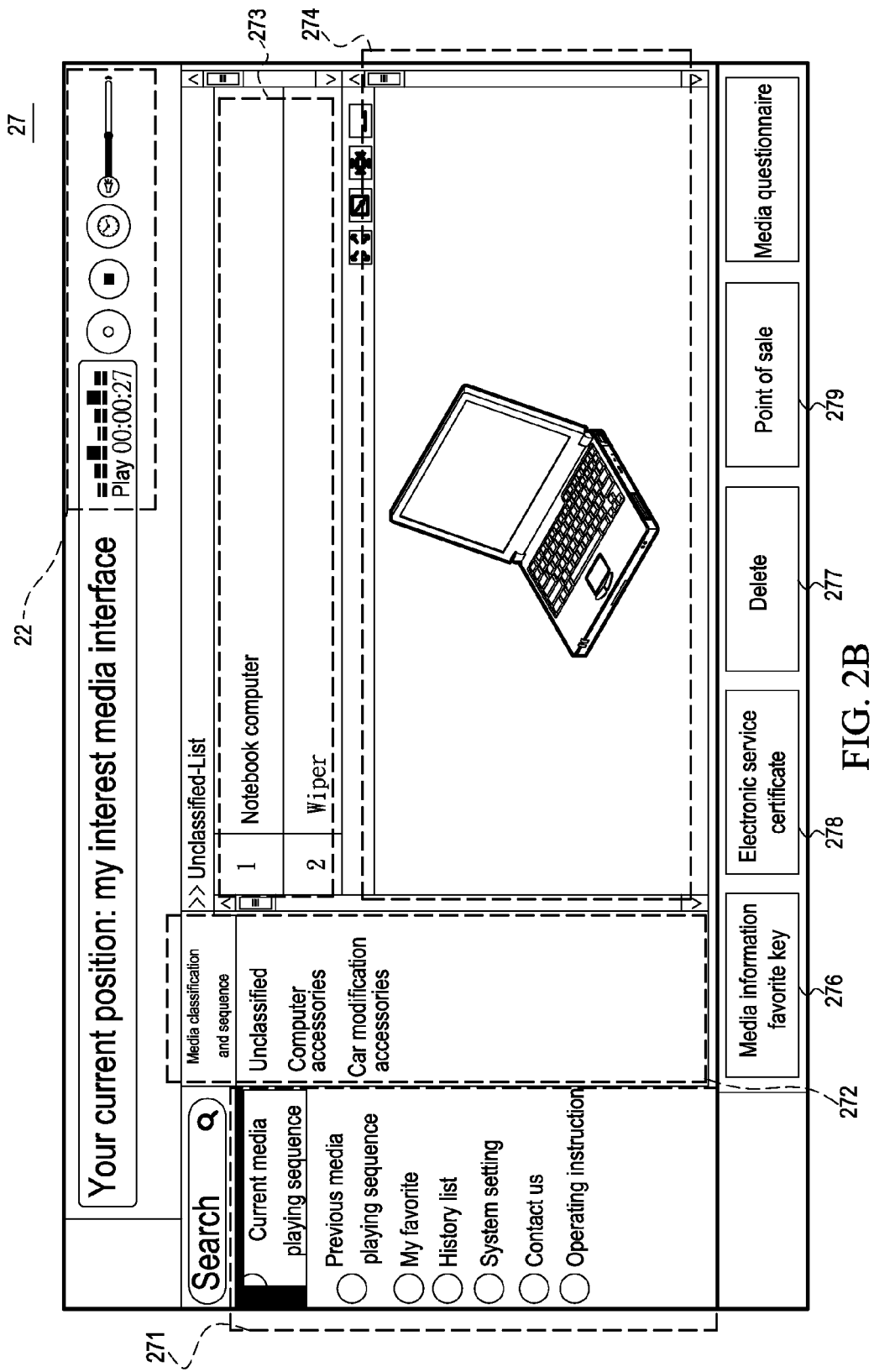

Referring to FIG. 2B, it is a schematic view of a picture of "my interest" media interface 71. Herein, the user interface 27 of each interface is illustrated with divided fields, and the left field is a user control area 271, including, but not limited to, current media playing sequence, previous media playing sequence, my favorite shortcut key, media playing history list, and system setting, which is also applicable to other types of interfaces.

The right side of the user control area 271 is a media classification area 272, which is used for classifying the received media information 121. The right side of media classification area 272 is a media sort area of the current media playing sequence (whether it is the initial media playing sequence or the secondary media playing sequence), which displays the playing sequence of each media information 121. The upper side is the playing unit 22 and keys.

The server 1 outputs media information 121 conforming to an initial media playing sequence 41 or a secondary media playing sequence, and the media playing device 2 plays the media information 121 one by one according to the initial media playing sequence 41 or the secondary media playing sequence 42. The initial media playing sequence 41 or the secondary media playing sequence 42 is listed in the media sort area 273 on the right side of the picture. The media sort area 273 displays names of products represented by the media information 121. A media playing area 274 on the lower right side of the picture plays simple image data of the media information 121 one by one. The user may directly click a name of media information 121, and the media playing area 274 performs conversion and plays the overall data content of the clicked media information 121. Alternatively, when the media playing area 274 displays product data that the user is interested in, the user may use the playing unit 22 on the upper side of the picture to control actions such as play, stop, and replay of the media information 121, or directly click the media playing area 274 to directly play the media information 121 that the user is interested in, and then use the playing unit 22 to control the media information 121.

However, the media playing sequences of media information 121 listed or directly played on different media interfaces are also different. For example, as shown in FIG. 2B, the content of a media playing sequence corresponding to the "my interest" media interface 71 is obtained by introducing personal data of member data or other relevant personal data or matching information of the media information 121 into a weighted distribution rule through the media management module 11. The media classification area 272 lists member's preferred product types in personal data of member data 141. For example, if the member's preferred product types are computer goods and car modification goods, the media sort area 273 only lists media information conforming to the product types of computer goods and car modification goods.

Figure 2C:
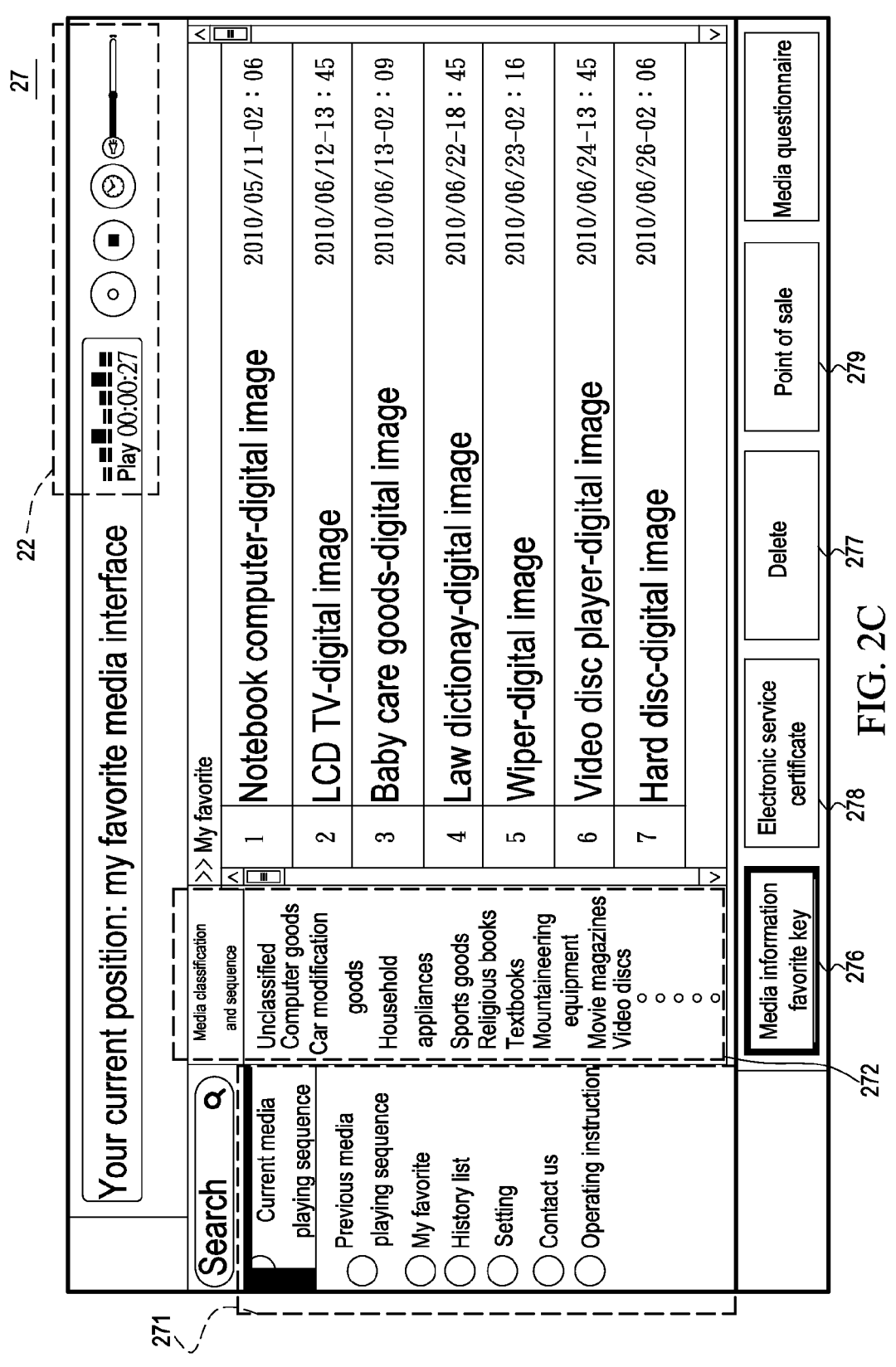

A shortcut key for quick start of other media interfaces may be configured below the user control area 271. As shown in FIG. 2B and FIG. 2C, when the user intends to collect the play content of any media information, the user may click a media information favorite key 276. The control module 21 then collects the play content of the selected media information 121 in a "my favorite" media information folder (that is, records the complete image of the media information in the memory unit 25). As shown in FIG. 2C, when the media information 121 is collected, the media information 121 is recorded in the "my favorite" media information folder sequentially according to the collecting time and sequence. The user can click one to play or delete by using the input module 24. The "my favorite" media information, media playing history list, and system setting are recorded in the memory unit 25 of the media playing device 2. However, after clicking the "my favorite" media interface 75 shown in FIG. 2A, the media playing device updates the picture to present the picture of the "my favorite" media information folder as shown in FIG. 2C.

Figure 2D:
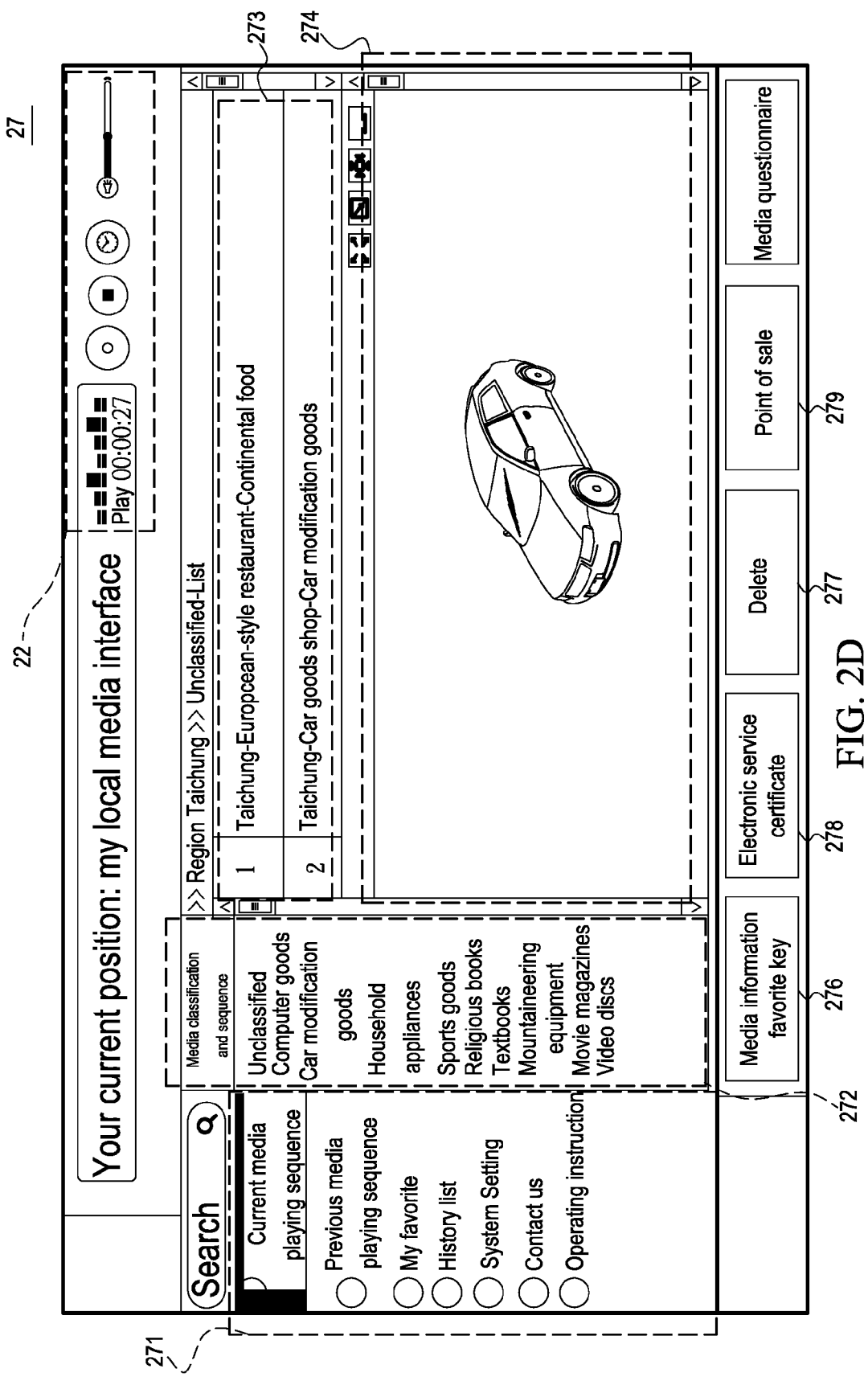

Referring to FIG. 2A and FIG. 2D, they are schematic views of the "my local media" interface. Upon clicking the "my local media" interface 72, the media playing device 2 presents the picture of the "my local media" interface 72.

The content of a media playing sequence corresponding to the my local media interface 72 is obtained by introducing at least one of member's gender, member's age, member's region of activity, member's family member, member's personal income, and member's family income and a matching condition thereof or other relevant personal data or matching information of media information 121 into a weighted distribution rule through the media management module 11. As shown in FIG. 2D, the media classification area 272 lists media information conforming to the basic condition of member's scope of activity. For example, if the region of activity in the personal data of the member data is "Taichung", the media sort area 273 only lists media information of a product type conforming to "Taichung" region.

Figure 2E:
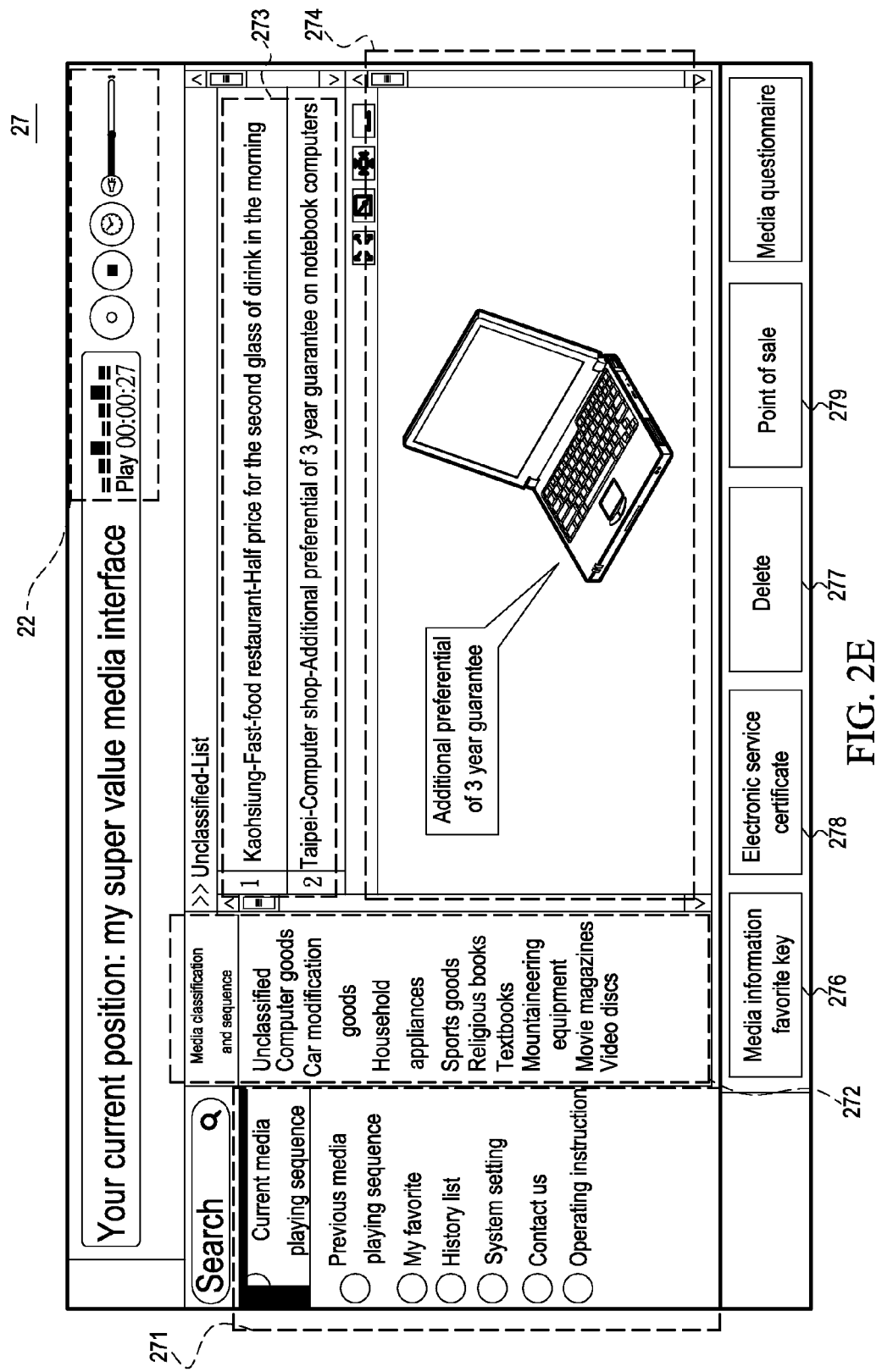

Referring to FIG. 2A and FIG. 2E, they are schematic views of the "my super value media" interface. Upon clicking the "my super value media" interface 73, the media playing device 2 updates the picture to present the picture of the "my super value media" interface 73.

The content of a media playing sequence corresponding to the my super value media interface 73 is obtained by introducing at least one of member's region of activity and product discount and a matching condition thereof or other relevant personal data or matching information of media information 121 into a weighted distribution rule through the media management module 11.

The media classification area 272 lists media information conforming to the basic condition of product discount. That is to say, the media playing sequence for displaying or playing the media information 121 on the interface is not based on member interest, but uses media information about whether a vendor provides a large discount or preferred extra service.

However, the media playing sequence is also assisted by relevant personal data such as member's region of activity. For example, if the region of activity in the personal data of the member data is "Pingtung", the media sort area 273 lists media information of the product type close to "Pingtung" region and having discount.

Figure 2F:
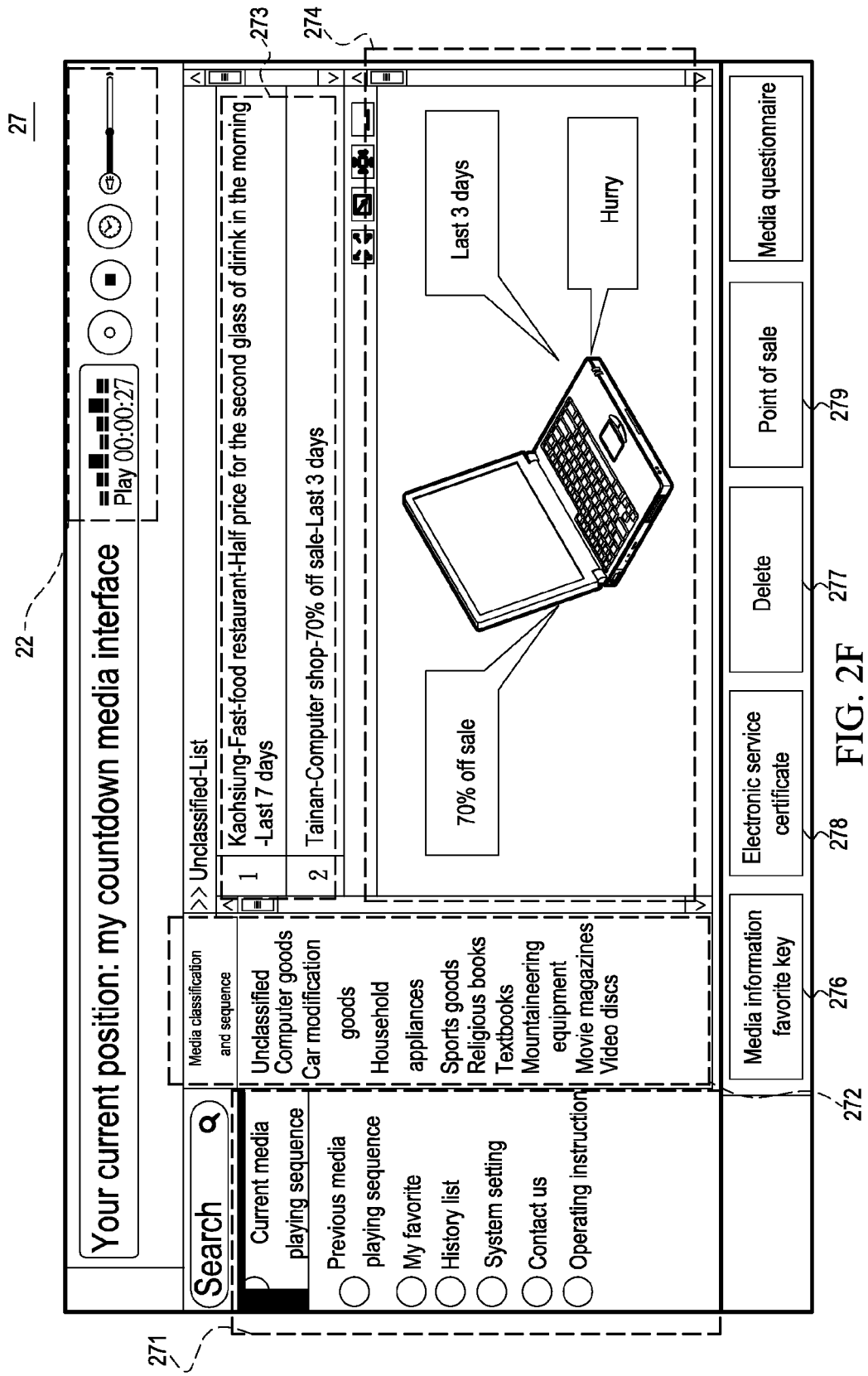

Referring to FIG. 2A and FIG. 2F, they are schematic views of the "my countdown media" interface. Upon clicking the "my countdown media" interface 74, the media playing device 2 presents the picture of the "my countdown media" interface 74.

It should be noted herein that, each media information 121 corresponds to a media playing time limit. The media playing time limit is recorded in source codes carried in the media information 121 or is managed by the media management module.

This embodiment differs from previously mentioned embodiments is that because the media management module 11 only introduces at least one of the media information 121 that is not clicked and having a media playing time limit that enters a countdown time limit into a weighted distribution rule, thereby obtaining a relevant media playing sequence (Either an initial media playing sequence or a secondary media playing sequence). That is to say, the media playing sequence for displaying or playing the media information 121 on the interface is based on a media playing time limit. For example, if the countdown time limit is 7 days, the media sort area 273 only lists media information close to "countdown time limit that is below 7 days".

In addition, when the content of the media playing sequence corresponding to the my countdown media interface 74 is updated, a warning message of media information 121 entering a countdown time limit is provided to the media playing device 2 and is displayed on the display module 23 of the media playing device 2 for reference of the user. Moreover, the media management module 11 deletes the media information 121 that reaches the media playing time limit.

Figure 2G:
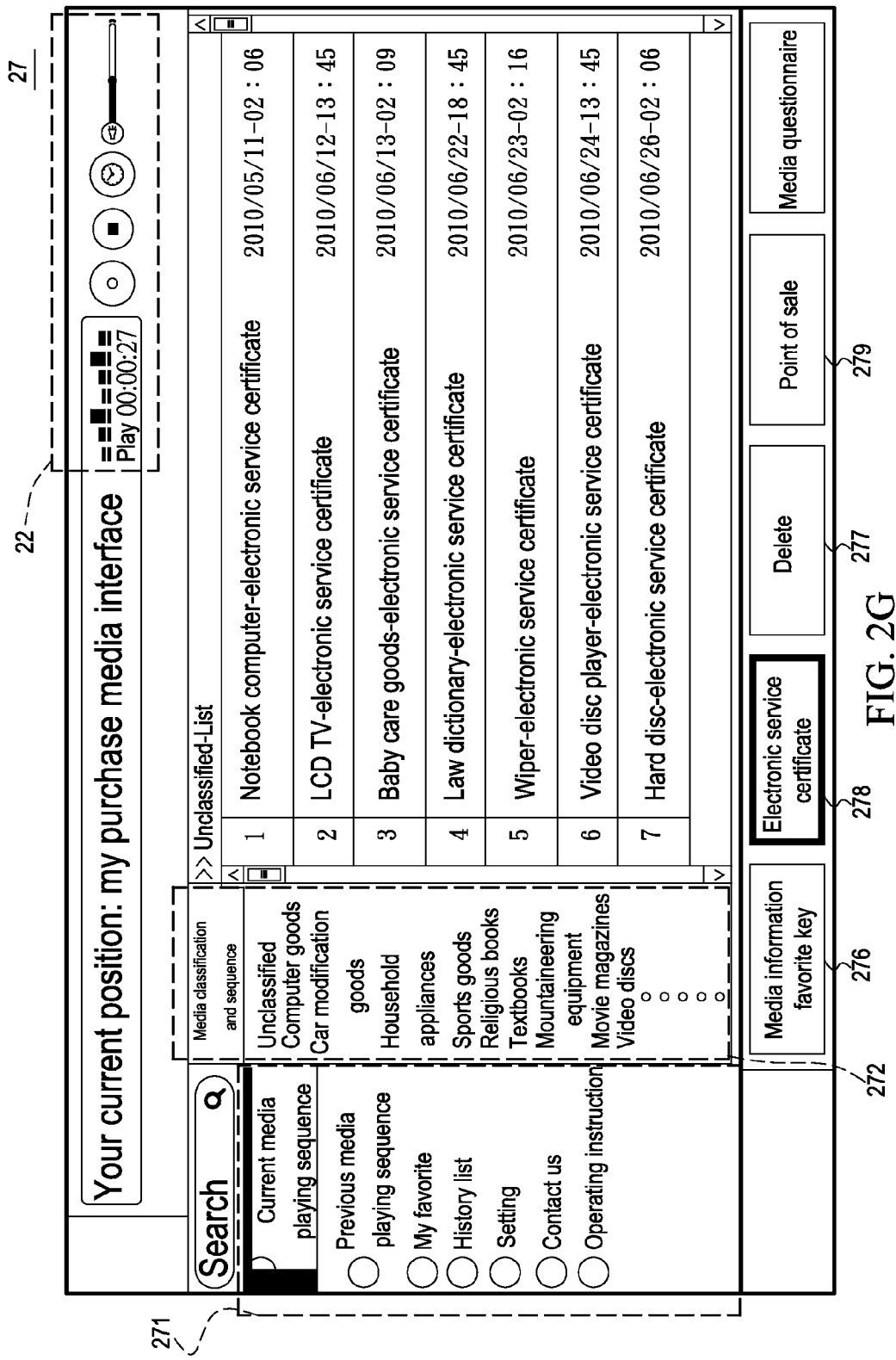

Referring to FIG. 2A and FIG. 2G, they are schematic views of the "my purchase media" interface. After clicking the "my purchase media" interface 76 on FIG. 2A, the media playing device 2 presents the picture of the "my purchase media" interface 76 shown in FIG. 2G.

The difference between this embodiment and the above embodiments is that the media classification area 272 lists media information conforming to the basic condition of obtaining a product discount after purchasing an electronic service authentication corresponding to the media information 121. In other words, the media playing sequence for displaying or playing the media information 121 on the interface uses information on whether or not a vendor provides an electronic service authentication related to a product.

For the media information 121 with the electronic service authentication purchasable in the media classification area 272, the electronic service authentication is also recorded in the media database 11, and the user may obtain the relevant electronic service authentication either from a provider apparatus or by interacting with the media management module 11. A seller's service apparatus must be connected to the server 1. When the user purchases a product from the seller and provides corresponding data of the relevant electronic service authentication (e.g. member data), the seller provides a service of the product corresponding to the electronic service authentication (e.g. a discount, a gift, or other benefits) upon detection through the server 1 that the user really has purchased the relevant electronic service authentication.

However, the user also can use the input module 24 to click an electronic service authentication key 278 or a sale point key 279, in order to quickly start other interfaces to view a sale point of the media information 121 or obtain by purchasing the electronic service authentication of the required media information 121 or view a product sales web page of the provider.

Figure 2H:
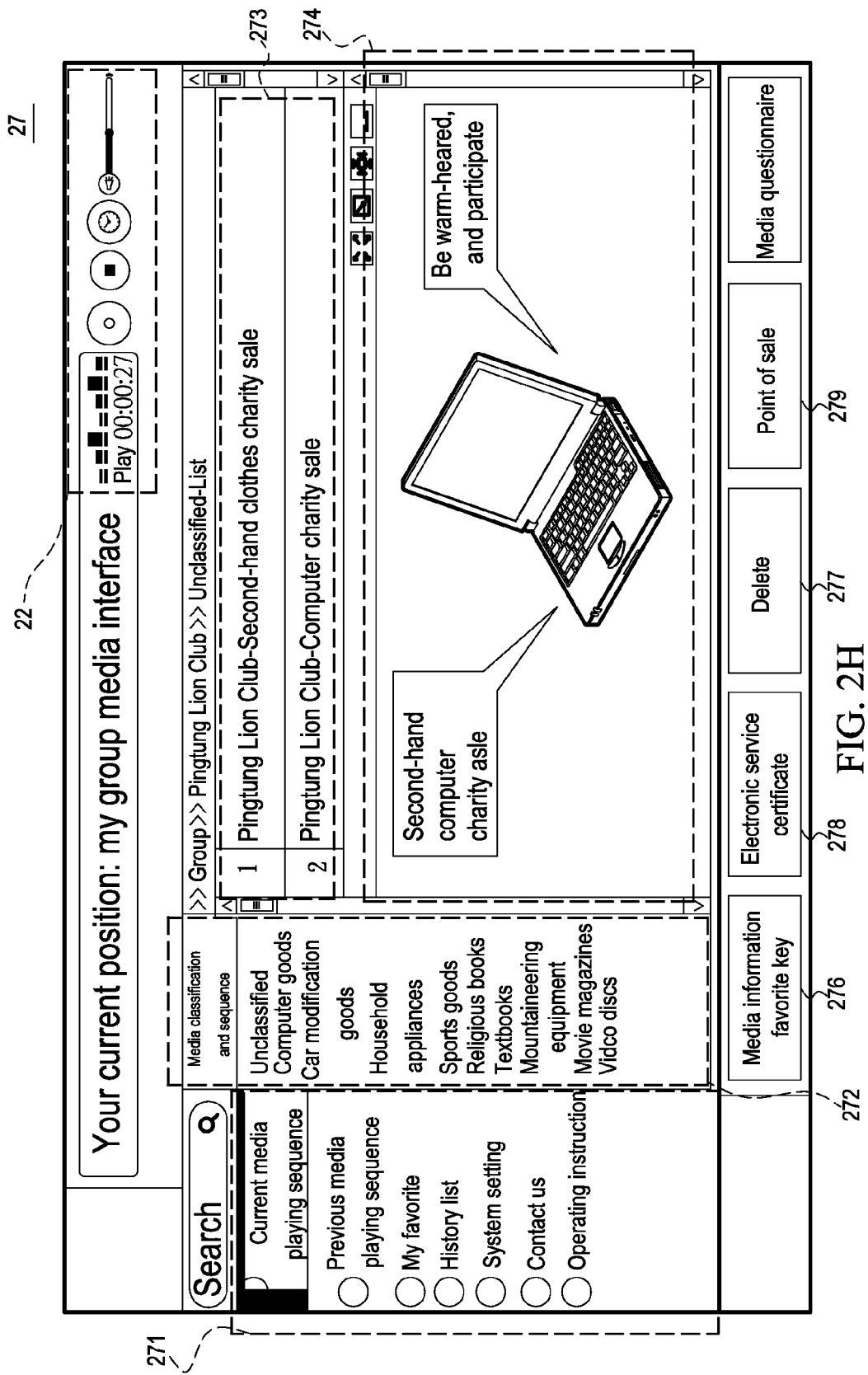
Figure 2I:
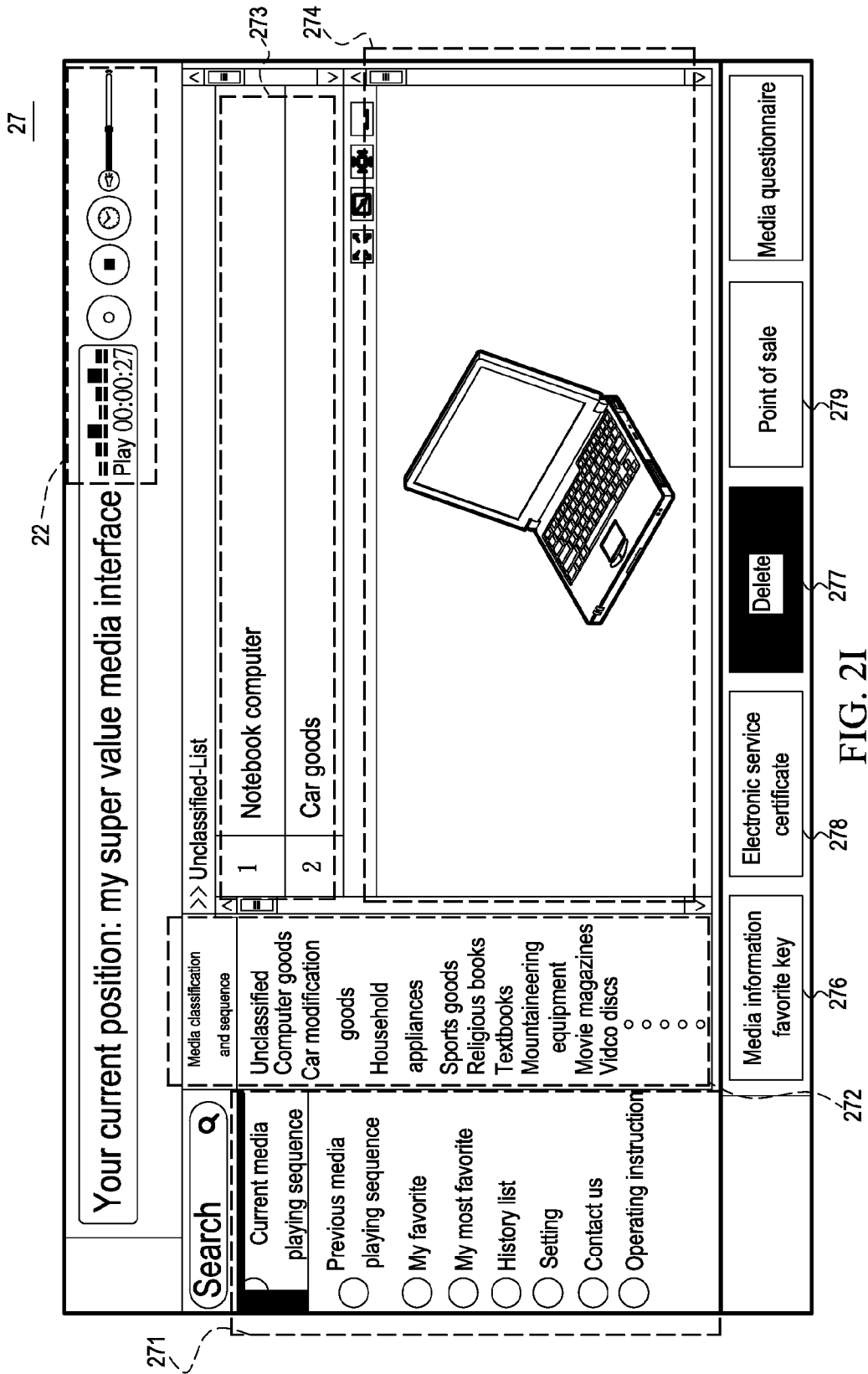
Figure 2J:
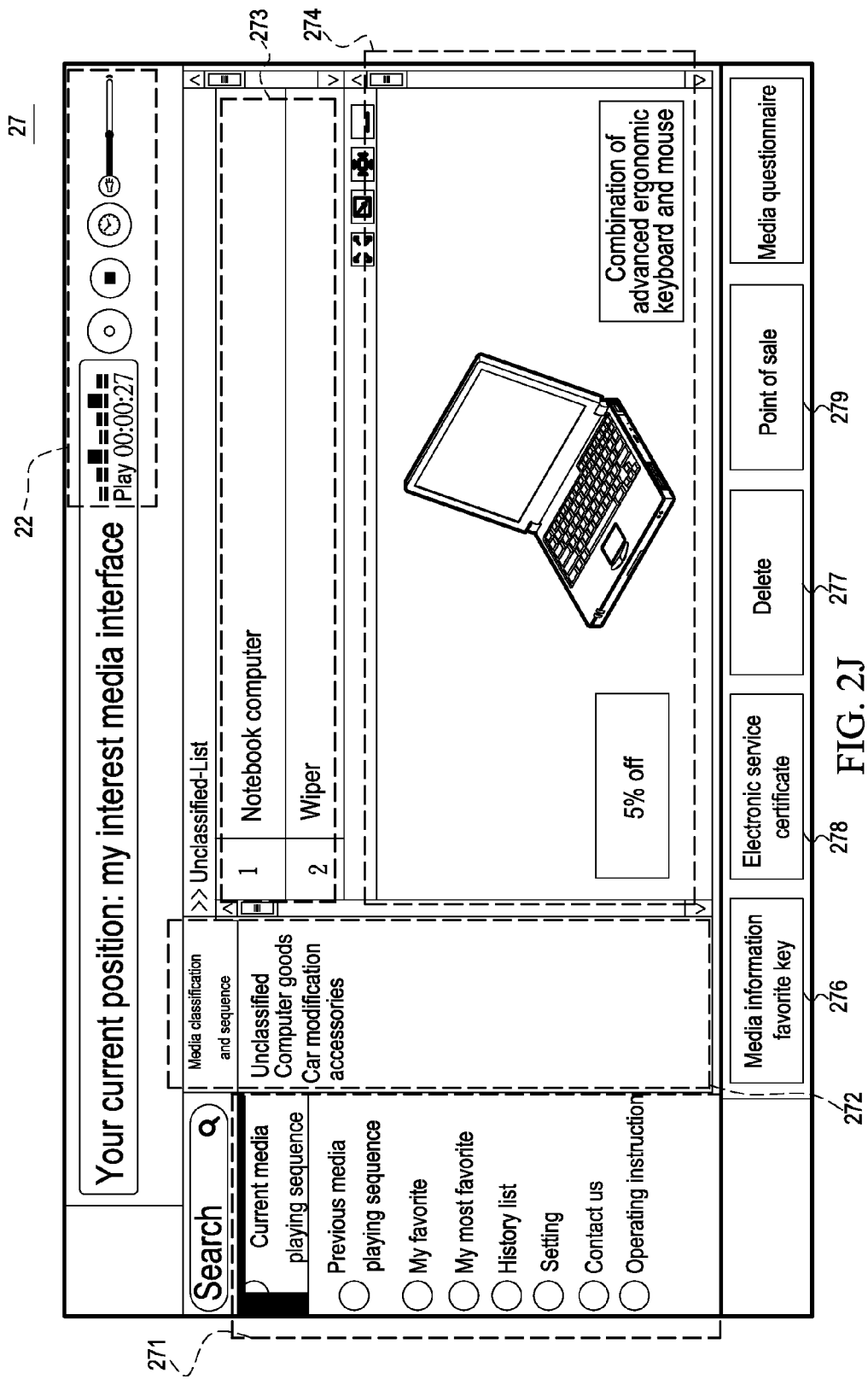

Referring to FIG. 2A and FIG. 2J, they are schematic views of the "my group media" interface. After clicking the "my group media" interface 77, the media playing device 2 presents the picture of the "my group media" interface 77.

The content of the media playing sequence corresponding to the "my group media" interface 77 is obtained by introducing at least one of member's work unit and member's occupational field and a matching condition thereof or other relevant personal data or matching information of media information 121 into a weighted distribution rule through the media management module 11.

As shown in FIG. 2H, the media classification area 272 lists media information conforming to the basic condition of member's work unit. For example, if the member's work unit in the personal data of the member data is "Pingtung Lion Club", the media sort area 273 only lists media information of a product type conforming to "Pingtung Lion Club" region, and other members not belonging to the same work unit will not obtain relevant media information about "Pingtung Lion Club".

As shown in FIG. 2I, when the media playing device 2 plays the media information 121 one by one according to an initial media playing sequence 41 or a secondary initial media playing sequence 42, if a certain media information 121 is not favored or demanded by a user, the user may use the input module 24 to click a delete key 277 in order to remove the sorting of the undesired media information 121.

However, the user also can use the input module to click the electronic service authentication key 278 or the sale point key 279 to view a sale point of the media information 121 in order to obtain an electronic service authentication of the required media information or view a product sales web page of a provider, and so on. The control module 21 transmits back processing information 33 of the media information 121 to form the click-to-read history information 122 by the media management module 11.

As shown in FIG. 2J, when the media playing device plays media information one by one according to a secondary media playing sequence, if media information with reward information is played, a selection picture is directly presented in the media playing area and displays various reward information of the current media information. When using the input module to perform a transaction behavior of the current media information, the user may select a reward manner from the reward information in the transaction behavior.

In addition, when the server 1 no longer transmits or updates any media information, the server 1 informs the media playing device 2 connected to the server 1 or performs data exchange with the media playing device to update any of the above media information 121.

Figure 3A:
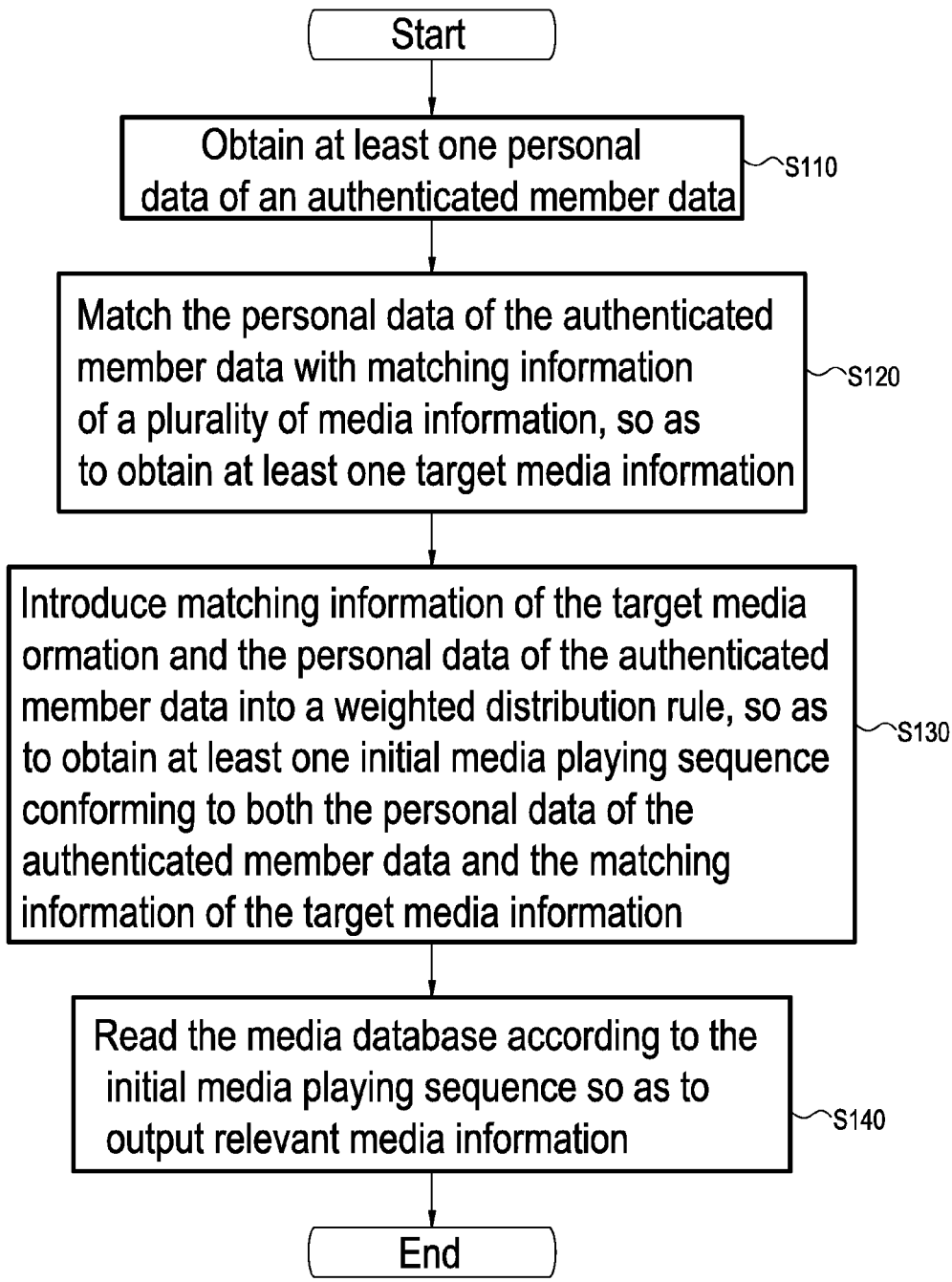
FIG. 3A and FIG. 3D are schematic flow charts of an interactive media playing method according to an embodiment of the present invention.
Figure 3B:
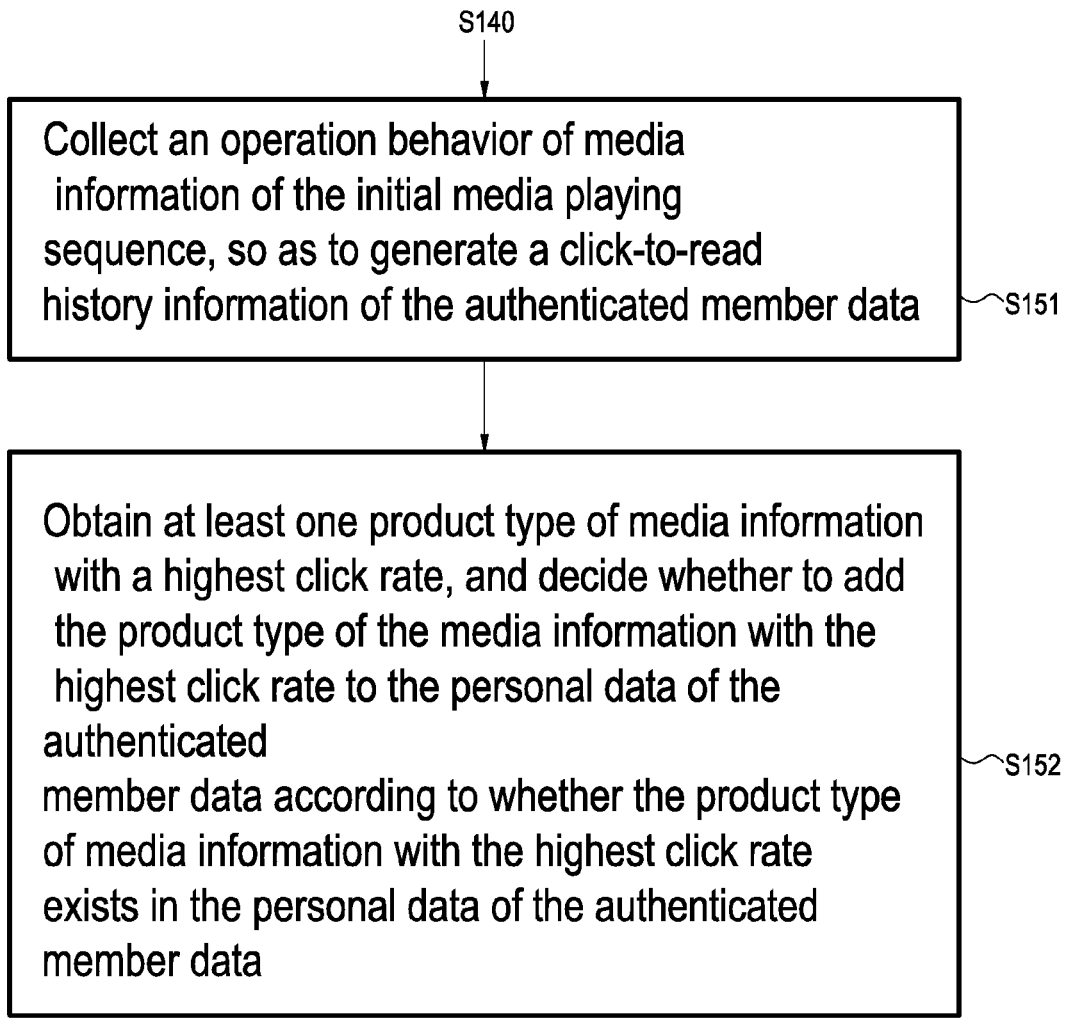
FIG. 3E is a schematic flow chart of a genetic algorithm according to an embodiment of the present invention.
Figure 3C:
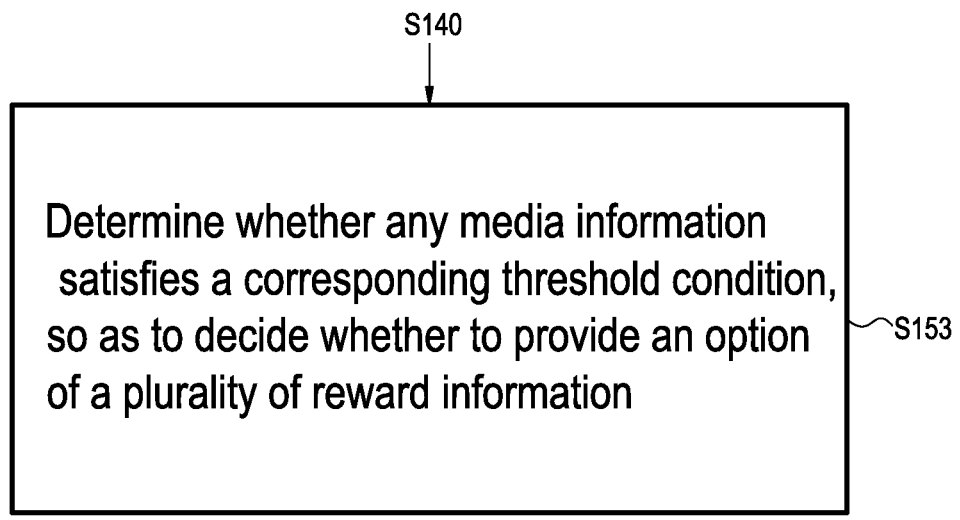
Figure 3D:
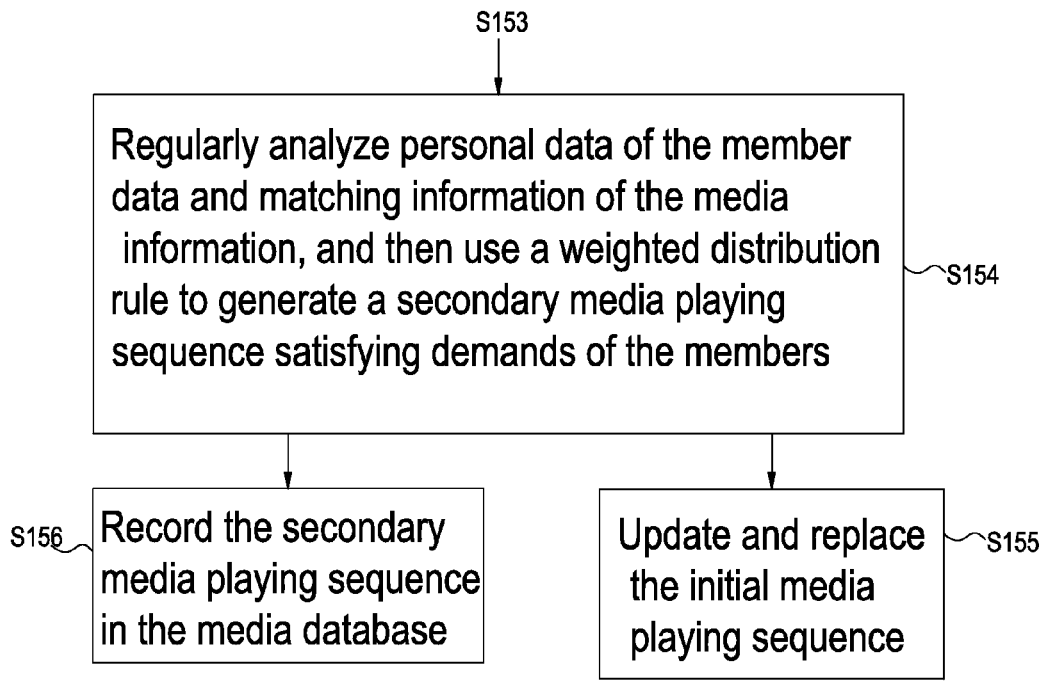

Referring to FIG. 3A and FIG. 3D, they show an interactive media playing method according to an embodiment of the present invention. Meanwhile, reference is made to FIG. 1 to FIG. 2I for ease of understanding. The method includes the following steps.

At least one personal data of an authenticated member data is obtained (Step S110).

In this step, a user uses the input module 24 to input an account number data 31. The control module 21 receives and transmits the account number data 31 to the server 1. The member management module 13 certifies the account number data 31. When the member management module 13 determines that the authentication is completed, the member management module 13 notifies the media management module 11 of current authenticated member data on which the authentication is completed.

The personal data of the authenticated member data is matched with matching information of a plurality of media information to obtain at least one target media information (Step S120).

The media management module 11 determines by itself the order of importance for data contents of member data 141 after a member authentication analysis is completed. Afterward the media management module 11 firstly uses personal data of the member data 141 to find at least one target media information conforming thereto.

Matching information of the target media information and the personal data of the authenticated member data are introduced into a weighted distribution rule so as to obtain at least one initial media playing sequence conforming to both the personal data of the authenticated member data and the matching information of the target media information (Step S130). The weighted distribution rule is any one of or a combination of two or more algorithms. Example algorithms include a fusion algorithm, a multivariate statistical analysis algorithm, a data sort algorithm, a genetic algorithm, and a particle swarm optimization algorithm. The initial media playing sequence 41 or a later secondary media playing sequence 42 may be stored in the media database 12.

The media database is read according to the initial media playing sequence to output relevant media information (Step S140). Regardless of the system architecture in FIG. 1A and FIG. 1B, the media management module 11 outputs relevant media information 121 to the media playing device 2 according to the initial media playing sequences 41. The control module 21 uses the playing unit 22 to play the media information 121 according to a receiving sequence of the media information 121 (that is, the initial media playing sequences 41), and the media information 121 is displayed in the visual field of the user through the display module 23.

FIG. 3B is a schematic view of the subsequent process of the interactive media playing method according to the embodiment of the present invention. Reference is made to FIG. 3B in combination with the process shown in FIG. 3A for ease of understanding. The process is as follows.

An operation behavior for media information of the initial media playing sequence is collected, so as to generate click-to-read history information of the authenticated member data (Step S151). The user may use the input module 24 to perform various processing actions on the played media information 121. The processing actions such as clicking, selection, and deletion are already shown in FIGS. 1A-2J and will not be described herein again.

As shown in FIG. 1C, the processing behaviors for the media information 121 form processing information 33 by the control module 21, and processing information then is transmitted back to the media management module 11. The media management module 11 collects the processing information transmitted back by the control module 21 within a preset time so as to form click-to-read history information 122 corresponding to the authenticated member data.

At least one product type of media information with highest click rate is obtained, and it is decided whether to add the product type of the media information with the highest click rate to the personal data of the authenticated member data depending on whether the product type of the media information with the highest click rate exists in the personal data of the authenticated member data (Step S152, FIG. 3B).

The click-to-read history information 122 not only records the processing information transmitted back by the control module 21, but also records the product type of the media information that is operated. The media management module 11 obtains at least one product type of media information with highest click rate according to the click-to-read history information 122 corresponding to the authenticated member data and decides whether to add the product type to the personal data of the authenticated member data depending on whether the product type exists in the personal data of the authenticated member data.

FIG. 3C is a schematic view of the subsequent process of the interactive media playing method according to the embodiment of the present invention. Reference is made to FIG. 3C in combination with the process shown in FIG. 3A for ease of understanding. The process is as follows.

In order to decide whether to provide an option of a plurality of reward information, a determination is made on whether any media information satisfies a corresponding threshold condition (Step S153). The reward module 15 determines whether each media information 121 satisfies a corresponding threshold condition within a preset time. The threshold condition may refer to whether a number of processing times of each media information reaches a threshold, or whether numbers of processing times of all the media information reach the threshold, and the value of the threshold is specified by the manufacturer and designed in the system or designed by the media management module 11 itself. It should be noted that the present invention is not limited thereto.

If the media management module 11 determines that any media information 121 does not satisfy the threshold condition, the media management module 11 re-collects a number of processing times of the media information.

On the contrary, if the media management module 11 determines that any media information 121 satisfies the threshold condition, the media management module 11 uses a weighted distribution rule to re-generate a secondary media playing sequence 42 in order to output the media information according to the secondary media playing sequence 42.

Moreover, when the reward module 15 determines that any media information satisfies the threshold condition, the reward module 15 provides various reward information about the media information 121 and provides an option for the user to select one from the reward information.

FIG. 3D is a schematic view of the subsequent process of the interactive media playing method according to the embodiment of the present invention. Reference is made to FIG. 3D in combination with the process shown in FIG. 3C for ease of understanding. The process is as follows.

The media management module 11 regularly analyzes personal data of the member data 141 and matching information of the media information 121 and then uses a weighted distribution rule to generate a secondary media playing sequence 42 satisfying demands of the members (Step S154). Afterward the media management module 11 records the secondary media playing sequence 42 in the media database 12 (Step S155), or further updates and replaces the initial media playing sequence 41 with the secondary media playing sequence 42 (Step S156). Both operations may be implemented.

Figure 3E:
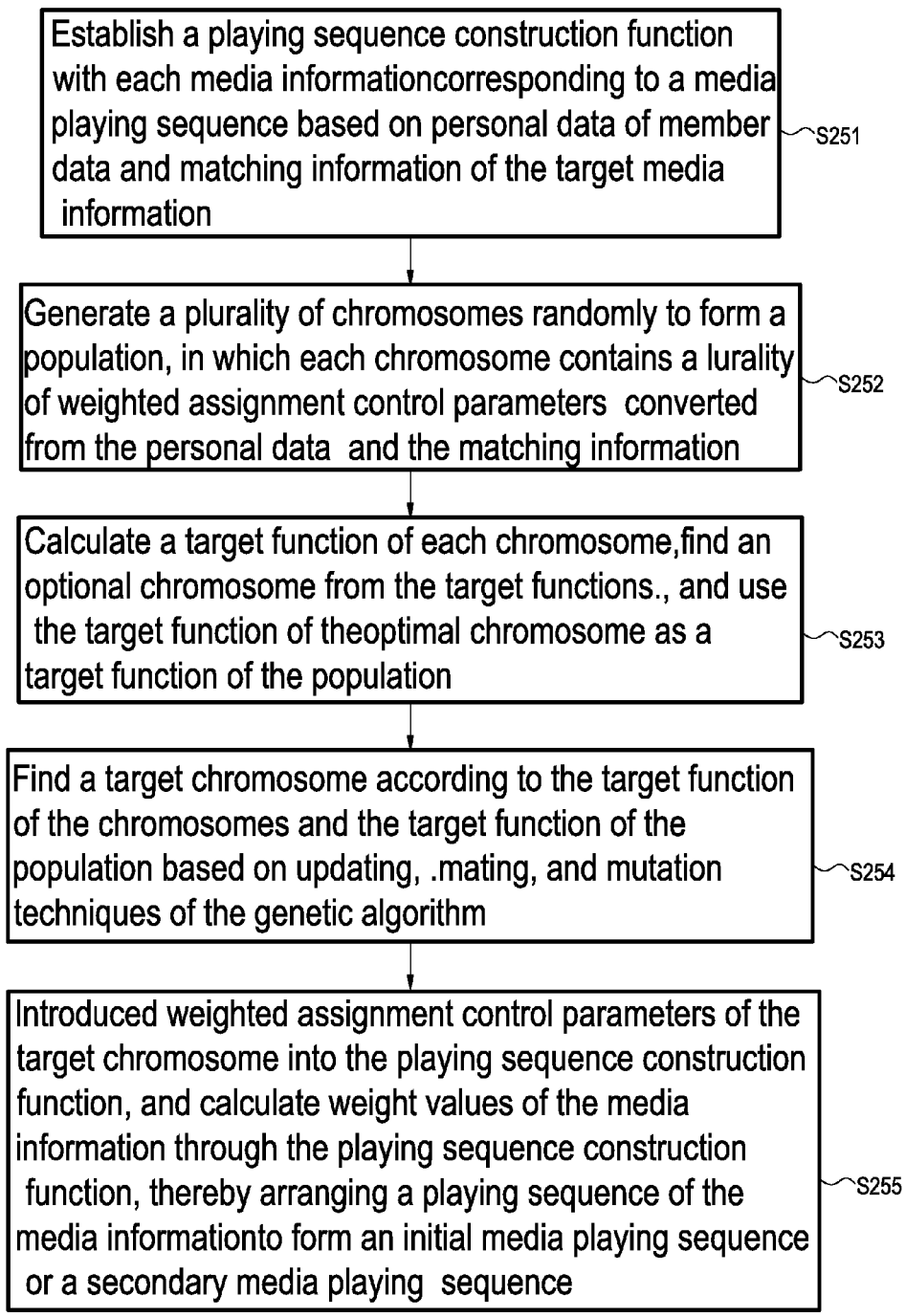

Referring to FIG. 3E, it is a schematic flow chart of a genetic algorithm according to an embodiment of the present invention. The genetic algorithm is applied in the establishment of a media playing sequence (regardless of an initial media playing sequence or a secondary media playing sequence or any later media playing sequence). The method is as follows.

A playing sequence construction function with each media information 121 corresponding to a media playing sequence is established according to personal data of member data 141 and matching information of target media information (Step S251). Furthermore, click-to-read history information 122 may also be added to serve as the basis of constructing the playing sequence construction function. A model of the playing sequence construction function is assumed as follows.

$$\hat{y}[n] = \sum_{k=1}^{N} \hat{a}_k \hat{y}[n-k] + \sum_{k=0}^{M} \hat{b}_k x[n-k]$$
$$= \hat{a}_1 \hat{y}[n-1] + \hat{a}_2 \hat{y}[n-2] + \ldots + \hat{a}_N \hat{y}[n-N] +$$
$$\hat{b}_0 x[n] + \hat{b}_1 x[n-1] + \hat{b}_2 x[n-2] \ldots + \hat{b}_M x[n-M]$$

Equation (1)

where $\hat{y}$ is the media playing sequence to be calculated with Equation (1), $\hat{a}_k$ and $\hat{b}_k$ are coefficients of Equation (1), which is a model obtained by converting the personal data of the member data and the matching information of the target media information matching with each other, and x is an external change factor of the above model of the playing sequence construction function. However, a coefficient vector estimated by the playing sequence construction function is $\Theta = [\theta_1, \theta_2, \ldots, \theta_m] = [\hat{a}_1, \hat{a}_2, \ldots, \hat{a}_N, \hat{b}_0, \hat{b}_1, \ldots, \hat{b}_M]$, where m=N+M+1 represents a total number of coefficients of the playing sequence construction function.

A plurality of chromosomes is generated randomly to form a population, in which each chromosome contains a plurality of weighted distribution control parameters converted from the personal data and the matching information (Step S252).

A target function of each chromosome is calculated, an optimal chromosome is found from the target functions, and the target function of the optimal chromosome is used as a target function of the population (Step S253). A target coefficient vector refers to a coefficient vector having an optimal value function in the population, that is, coefficients of the playing sequence construction function contained in the coefficient vector that enable the output value $\hat{y}$ of the playing sequence construction function in Equation 1 to be an optimal convergence value.

A target chromosome is found by the target functions of the chromosomes and the target function of the population based on updating, mating, and mutation techniques of the genetic algorithm (Step S254).

Weighted distribution control parameters of the target chromosome are introduced into the playing sequence construction function, and weight values of the media information 121 are calculated through the playing sequence construction function to arrange a playing sequence of the media information 121 to form an initial media playing sequence 41 or a secondary media playing sequence 42 (Step S255).

However, the process above is just one implementation of the technique of the weighted distribution rule, and the present invention is not limited thereto. In a similar manner, the initial media playing sequence 41 or the secondary media playing sequence 42 may be generated by using one of or a combination of two or more of the above algorithms such as fusion algorithms, multivariate statistical analysis algorithms, data sort algorithms, particle swarm optimization algorithms, and the like.

The processing actions of the media management module 11 are already described in above and will not be described herein again.

Figure 4:
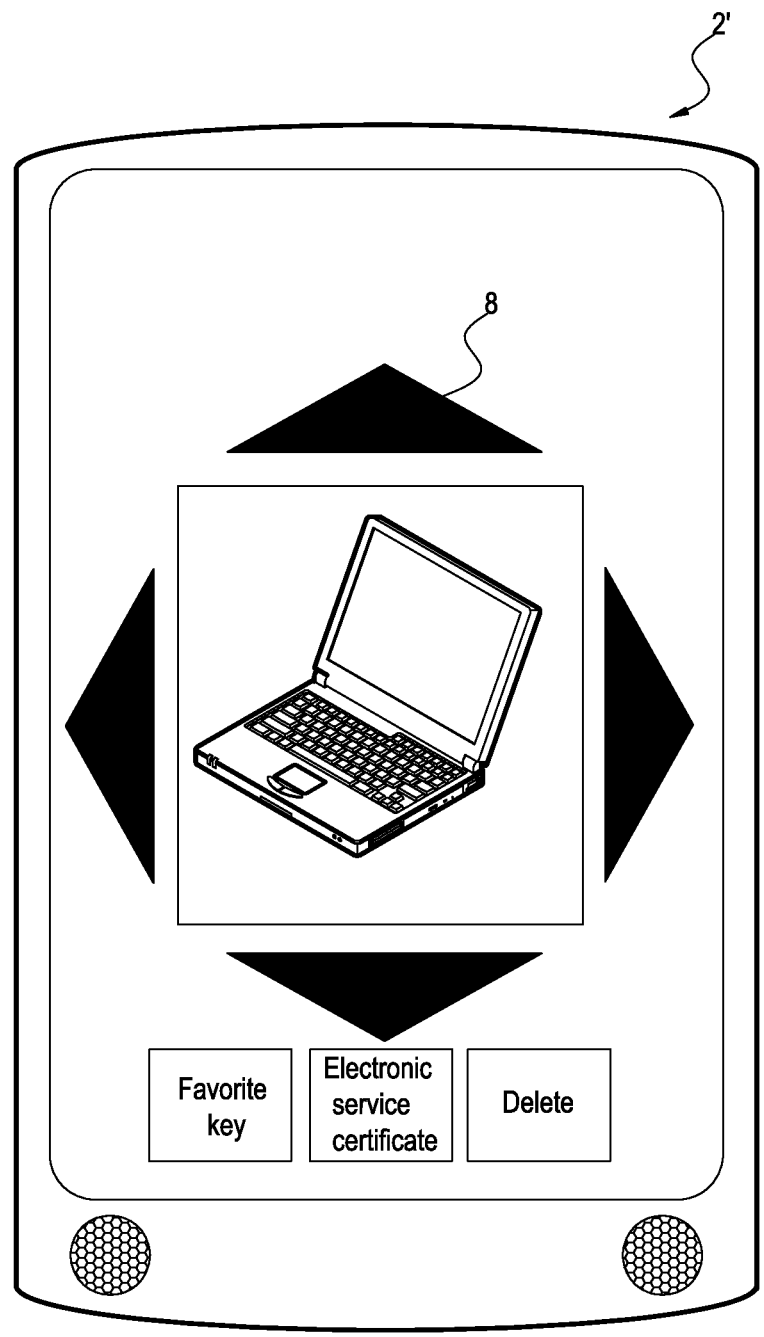
FIG. 4 is a schematic view of the installation and a display picture of a media playing device according to an embodiment of the present invention.

FIG. 4 is a schematic view of the installation and a display picture of a media playing device according to an embodiment of the present invention. The media playing device 2' may be a handheld electronic apparatus or a portable electronic apparatus and any other type of electronic device. If a display screen of the media playing device 2' is small, operation interfaces may be simplified. For example, a playing picture of a playing program is displayed alone, and simple graphics keys are configured around the playing picture, or relevant physical keys are configured on a housing of the device in order to switch the media interfaces and perform other functions on media information 121.

Although only some embodiments are described in this document, it will be obvious that the invention may be varied in many other ways other than those embodiments presented. Such variations are not to be regarded as a departure from the spirit and scope of the invention, and all such modifications as would be obvious to one skilled in the art are intended to be included within the scope of the following claims.

What is claimed is:

1. An interactive media playing system comprising:
    a server, comprising:
    a member database for recording a plurality of member data;
    a media database for recording a plurality of media information;
    a member management module for obtaining an authentication analysis corresponding to any one of the plurality of member data; and
    a media management module for searching at least one target media information from the media information according to personal data of the member data corresponding to the authentication analysis, and introducing the personal data and a matching information of at least one target media information into a weighted distribution rule, the weighted distribution rule is a genetic algorithm, wherein the media management module establishes a playing sequence construction function corresponding to at least one target media information according to the personal data of the authenticated member data and the matching information of the at least one target media information, the media management module randomly generates a plurality of chromosomes to form a population, wherein each chromosome contains a plurality of weighted distribution control parameters converted from he personal data and the matching information, the media management module calculates at target function of each of the chromosomes, finds an optimal chromosome from the target functions, and uses the target function of the optimal chromosome as the target function of the population, the media management module performs an updating, mating, and mutation process on the target functions of the chromosomes and the target function of the population, so as to find a target chromosome, and the media management module introduces weighted distribution control parameters of the target chromosome into the playing sequence construction function, and calculates weight values of the media information through the playing sequence construction function to arrange a playing sequence of the media information to form at least one initial media playing sequence, and outputting at least one target media information according to at least one initial media playing sequences; and
    a media playing device for performing the authentication analysis with the member management module to obtain at least one target media information conforming to at least one initial media playing sequence, and to operate and play the media information.

2. The interactive media playing system according to claim 1, wherein the media management module provides a plurality of media interfaces for display on a display module of the media playing device, and the media management module introduces the personal data and the matching information corresponding to the media interfaces into the weighted distribution rule according to properties of the media interfaces, to generate at least one initial media playing sequence with different contents.

3. The interactive media playing system according to claim 1, wherein the media playing device transmits back processing information of the media information corresponding to the authenticated member data to the media management module, and the media management module generates click-to-read history information corresponding to the authenticated member data.

4. The interactive media playing system according to claim 3, wherein the media management module calculates at least one product type of media information with a highest click rate according to the click-to-read history information corresponding to the authenticated member data, and decides whether to add the product type to the personal data of the authenticated member data according to whether the product type exists in the personal data of the authenticated member data.

5. The interactive media playing system according to claim 4, further comprising a reward module, wherein the media database further stores a threshold condition corresponding to each of the media information, where the threshold condition is a number of processing times of the processing information of that each of the media information reaches a threshold or numbers of processing times of the processing information of all the media information reach the threshold, and when the reward module determines that any media information satisfies the corresponding threshold, the reward module provides an option of selecting one from a plurality of reward information.

6. An interactive media playing method, applied to a server providing media information to a media playing device according to login of the media playing device, the method comprising:
    obtaining personal data of a authenticated member data by a member management module;
    matching the personal data of the authenticated member data with matching information of a plurality of media information by a media management module so as to obtain at least one target media information from the media information;
    introducing matching information of at least one target media information and the personal data of the member data into a weighted distribution rule by the media management module, so as to obtain at least one initial media playing sequence, wherein the weighted distribution rule is a genetic algorithm, and is implemented as follows: comprising:
    establishing a playing sequence construction function corresponding to at least one target media information according to the personal data of the authenticated member data and the matching information of the at least one target media information;
    randomly generating a plurality of chromosomes to form a population, wherein each chromosome contains a plurality of weighted distribution control parameters converted from the personal data and the matching information;

calculating a target function of each of the chromosomes, finding an optimal chromosome from the target functions, and using the target function of the optimal chromosome as the target function of the population;

performing an updating, mating, and mutation process on the target functions of the chromosomes and the target function of the population, so as to find a target chromosome; and introducing weighted distribution control parameters of the target chromosome into the play sequence construction function, and calculating weight values of the media information through the playing sequence construction function to arrange a of the media information to form at least one initial media playing sequence; and outputting the at least one target media information to the media playing device according to initial media playing sequence by the media management module.

7. The interactive media playing method according to claim 6, further comprising:

collecting an operation behavior of at least one target media information of the at least one initial media playing sequence by the media management module so as to generate click-to-read history information of the authenticated member data; and obtaining at least one product type of media information with a highest click rate, and deciding whether to add the product type of the media information with the highest click rate to the personal data of the authenticated member data according to whether the product type of the media information with the highest click rate exists in the personal data of the authenticated member data by the media management module.

8. The interactive media playing method according to claim 7, further comprising:

determining whether any media information satisfies a corresponding threshold condition by the media management module to decide whether to provide selection of a plurality of reward information; and periodically generating at least one secondary media playing sequence according to the click-to-read history information in combination with the weighted distribution rule by the media management module to replace the at least one initial media playing sequence.

9. The interactive media playing method according to claim 8, wherein the weighted distribution rule is a genetic algorithm, and the step of periodically generating at least one secondary media playing sequence is implemented as follows:

establishing a playing sequence construction function corresponding to at least one target media information according to the personal data of the authenticated member data and the matching information of the at least one target media information;

randomly generating a plurality of chromosomes to form a population, wherein each chromosome contains a plurality of weighted distribution control parameters converted from the personal data and the matching information;

calculating a target function of each of the chromosomes, finding an optimal chromosome from the target functions, and using the target function of the optimal chromosome as the target function of the population;

performing an updating, mating, and mutation process on the target functions of the chromosomes and the target function of the population, so as to find a target chromosome; and introducing weighted distribution control parameters of the target chromosome into the playing sequence construction function, and calculating weight values of the media information through the playing sequence construction function to arrange a playing sequence of the media information to form at least one secondary media playing sequence.

10. The interactive media playing method according to claim 7, further comprising:

providing a threshold condition corresponding to each of the media information, where the threshold condition is a number of processing times of the processing information of that each of the media information reaches a threshold or numbers of processing times of the processing information of all the media information reach the threshold; and when any media information is determined to satisfy the corresponding threshold, providing an option of selecting one from a plurality of reward information.

11. The interactive media playing system according to claim 5, wherein the media management module determines whether any media information satisfies a corresponding threshold condition by the media management module to decide whether to provide selection of a plurality of reward information; and the media management module periodically generates at least one secondary media playing sequence according to the click-to-read history information in combination with the weighted distribution rule by the media management module to replace the at least one initial media playing sequence.

* * * * *